(12) United States Patent
Cheung et al.

(10) Patent No.: US 7,174,384 B2
(45) Date of Patent: Feb. 6, 2007

(54) METHOD FOR DELIVERING LARGE AMOUNTS OF DATA WITH INTERACTIVITY IN AN ON-DEMAND SYSTEM

(75) Inventors: Kwok-Wai Cheung, Hong Kong (HK); Kwong-Wing Raymond Chan, Hong Kong (HK); Gin-Man Chan, Hong Kong (HK); Wing-Kai Lam, Hong Kong (HK)

(73) Assignee: Dinastech IPR Limited, Hong Kong (HK)

( * ) Notice: Subject to any disclaimer, the term of this patent is extended or adjusted under 35 U.S.C. 154(b) by 1011 days.

(21) Appl. No.: 09/917,638

(22) Filed: Jul. 31, 2001

(65) Prior Publication Data

US 2003/0074667 A1   Apr. 17, 2003

(51) Int. Cl.
  *G06F 15/16* (2006.01)
  *G11B 27/00* (2006.01)
  *H04N 7/173* (2006.01)
(52) U.S. Cl. .................. 709/231; 715/720; 386/68; 725/100; 375/240.12; 348/412.1
(58) Field of Classification Search ............. 709/231; 348/388.1, 412.1; 375/240.24, 240.12; 717/174, 717/178; 725/87, 101, 102, 100; 715/723, 715/720; 386/68
  See application file for complete search history.

(56) References Cited

U.S. PATENT DOCUMENTS 5,751,336 A *  5/1998 Aggarwal et al. ......... 725/146
5,822,530 A   10/1998 Brown
6,018,359 A *  1/2000 Kermode et al. ........... 725/101
6,057,832 A   5/2000 Lev et al.
6,211,901 B1 *  4/2001 Imajima et al. ............ 725/93
6,233,017 B1 *  5/2001 Chaddha ................ 375/240.12

FOREIGN PATENT DOCUMENTS

| EP | 0 749 242 B1 | 6/1996 |
|---|---|---|
| EP | 0 996 292 A1 | 4/2000 |
| WO | 99/60784 A1 | 11/1999 |
| WO | 00/16544 | 3/2000 |
| WO | 00/35201 | 6/2000 |
| WO | 00/59228 | 10/2000 |
| WO | 00/74367 A2 | 12/2000 |
| WO | IB00/01857 | 12/2000 |
| WO | IB00/01858 | 12/2000 |
| WO | 01/63929 A1 | 8/2001 |

* cited by examiner

*Primary Examiner*—Jeffrey Pwu
(74) *Attorney, Agent, or Firm*—Buchanan Ingersoll & Rooney PC

(57) ABSTRACT

A method and system for delivering data over a network to a large number of clients, which may be suitable for building large-scale Video-on-Demand (VOD) systems. In current VOD systems, the client may suffer from a long latency before starting to receive requested data that is capable of providing sufficient interactive functions, or the reverse, without significantly increasing the network load. The method utilizes two groups of data streams, one responsible for minimizing latency while the other provides the required interactive functions. In the anti-latency data group, uniform, or non-uniform or hierarchical staggered stream intervals may be used. The system may have a relatively small startup latency while users may enjoy most of the interactive functions that are typical of video recorders including fast-forward, forward-jump, and so on. Furthermore, the system can maintain the number of data streams, and therefore the bandwidth, required.

39 Claims, 14 Drawing Sheets

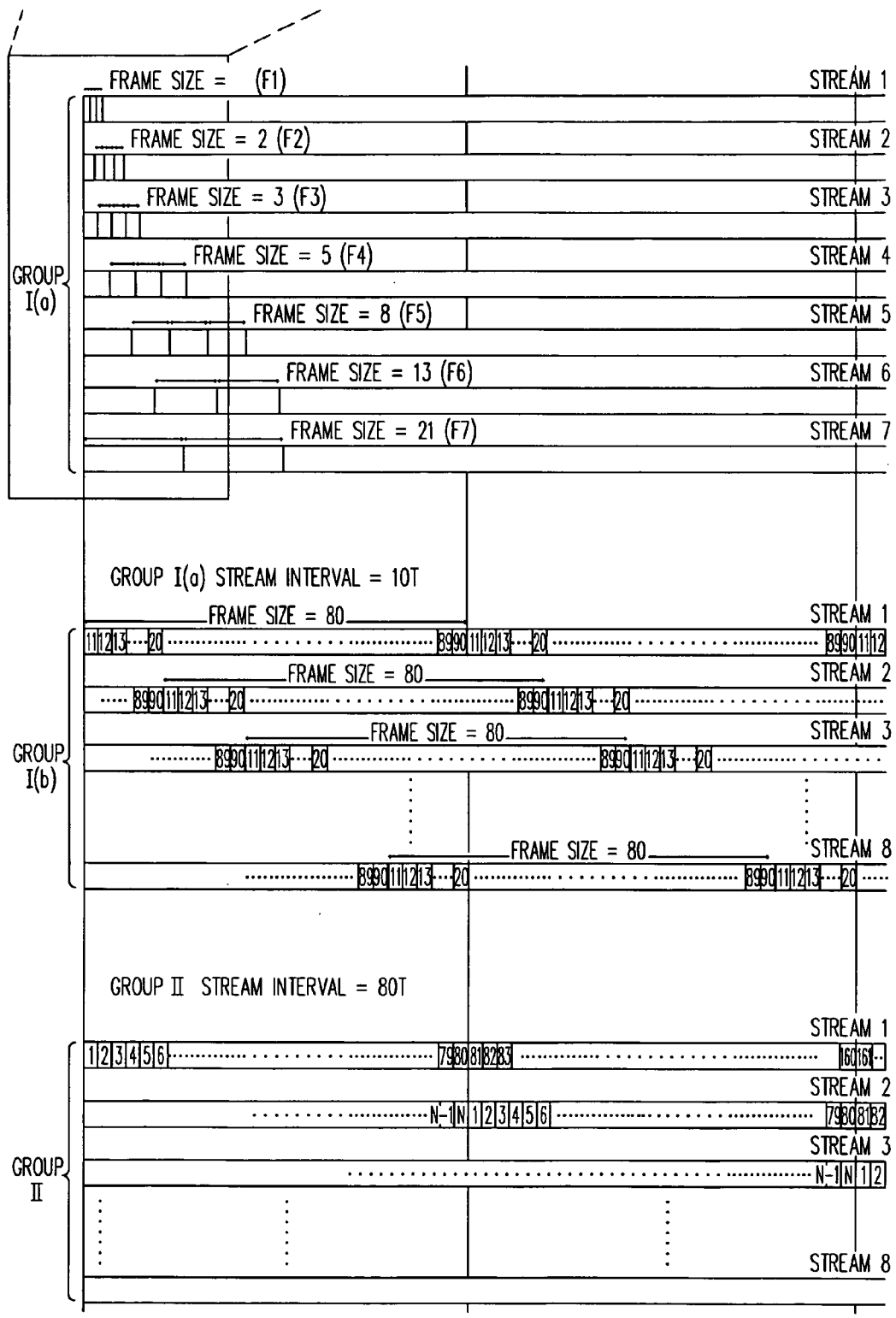
FIG. 10B (NOT IN SCALE)

METHOD FOR DELIVERING LARGE AMOUNTS OF DATA WITH INTERACTIVITY IN AN ON-DEMAND SYSTEM

FIELD OF THE INVENTION

This invention relates to methods and systems for delivering data over a network, particularly those for delivering a large amount of data with repetitive content to a large number of clients, like Video-on-Demand (VOD) systems.

BACKGROUND OF THE INVENTION

Current VOD systems face a number of challenges. One of them is how to provide the clients, which may be in the number of millions, with sufficient interactivity like fast-forward/backward and/or forward/backward-jump. At the same time, the provision of such functions should not impose severe network load, as the network resources namely the bandwidth may be limited. Furthermore, every client generally prefers to have the movie he selects to be started as soon as possible.

The following sections describe some of the currently used VOD systems and their possible disadvantages:

1. Near-VOD (NVOD) with Regular Stream-Interval

A NVOD system consists of staggered multicast streams with regular stream interval T (FIG. 1). The streams are multiplexed onto the same or different physical media for distribution to the users via some multiplexing mechanisms (such as time-division multiplexing, frequency division multiplexing, code-division multiplexing, wavelength division multiplexing etc. . . . ). The distribution mechanisms include point-to-point, point-to-multipoint and other methods. Each stream is divided into regular segments of interval T, and the segments are labelled 1, 2, 3, . . . , N respectively. The content that is to be distributed to the users is carried on the N segments and the content is replicated on all these streams. The content is also repeated on each stream in time. By using such a staggered streaming arrangement with regular stream interval T, the users are guaranteed to receive the content at any time with a start-up latency less than T. However, there is no provision for user interactivity in such a system. If a user interrupts the content viewing say by pausing the display, the user cannot resume the viewing at the same play point where the user pauses and is forced to skip some content to keep up with the multicast-stream that is continuously playing.

2. Quasi-VOD (QVOD) with Irregular Stream-Interval

A QVOD system consists of staggered multicast streams with irregular stream intervals (FIG. 2). The streams are multiplexed onto the same or different physical media for distribution to the users via some multiplexing mechanisms (such as time-division multiplexing, frequency division multiplexing, code-division multiplexing, wavelength division multiplexing etc. . . . ). The distribution mechanisms include point-to-point, point-to-multipoint and other methods. Unlike the NVOD system where the streams constantly exist, the streams in a QVOD system are created on demand from the users' request for the content. The users' requests within a certain time interval Ti are batched together and served together by Stream i. The stream intervals T1, T2, . . . Ti, . . . are irregular. The streams (Stream 1 to i etc. . . . ) are all provided on-demand and will be removed as soon as the content distribution has been completed. The streams are constantly created as users' requests come in. By using such a staggered streaming arrangement with irregular stream interval Ti, the particular group of users starting within interval Ti is guaranteed to receive the contents within Ti (start-up latency). Again, there is no provision for user interactivity in such a system. If a user interrupts the content viewing say by pausing the display, the user cannot resume the viewing at the same play point where the user pauses and is forced to skip some content to keep up with the multicast-stream that is continuously playing.

3. Distributed Interactive Network Architecture (DINA)

DINA system refers to the method and system as described in the applicant's PCT applications PCT/IB00/001857 & 001858. In the DINA system, interactive functions including fast-forward/backward, forward/backward-jump, slow motions, and so on can be provided by a plurality of multicast video data streams in conjunction with a plurality of distributed interactive servers. Although interactive functions may be provided to the client in such the DINA system, the network load may increases if the start-up time for each user's request is to be reduced. This is determined by the stream interval of the multicast data streams. Generally, the number of data streams, and therefore the network load, increases with the decrease of the stream interval.

In the NVOD and QVOD systems, a user wanting to view the content will simply tap into one of the many staggered streams and view the content simultaneously with all others sharing the stream. While such schemes are simple and efficient, they suffer from two difficulties—a large start-up latency and user inflexibility.

For the first difficulty, a user may have to wait as long as one stream interval T before the request is served, and the waiting time may be as large as many minutes or even hours, depending on the stream interval. Although the stream interval can be made very small, say even down to a few seconds, this also means that the system has to provide a large number of streams for serving the same amount of content. The number of streams required is simply $$\frac{R}{T},$$

where R is the length of the content and T is the stream interval. Thus, small start-up latency may incur a much higher transmission bandwidth and cost. The DINA system may also face such a difficulty.

For the second difficulty, the users viewing a multicast stream cannot freely interrupt the stream because there are other viewers. Therefore, NVOD and QVOD systems cannot allow VCR-liked interactivity such as pause, resume, rewind, slow motion, fast forward, and so on. These systems also hinder the introduction of new forms of interactive media to be deployed. In recent years, one popular approach to offer some form of VCR-liked interactivity over NVOD and QVOD systems is to add a storage unit to the set top box (STB) so as to cache all the available content being broadcast. Such systems suffer from a higher system cost and operational problems like storage unit failure and management.

It can be realised that the prior art may fail to provide a solution to the existing problems in VOD systems. Specifically, current VOD systems may not be able to provide the clients/users with desired interactive functions with a short start-up time, while at the same time minimising the network load. Therefore, it is an object of this invention to resolve at least some of the problems at set forth in the prior art. As a minimum, it is an object of this invention to provide the public with a useful choice.

SUMMARY OF THE INVENTION

Accordingly, this invention provides, in the broad sense, a method and the corresponding system for transmitting data over a network to at least one client having a latency time to initiate transmission of said data to the client. The method of this invention includes the steps of:
- generating at least one of anti-latency data stream containing at least a leading portion of data for receipt by a client; and
- generating at least one interactive data stream containing at least a remaining portion of said data for the client to merge into after receiving at least a portion of an anti-latency data stream.

The anti-latency data streams and the interactive data streams may be generated by at least one anti-latency signal generator and at least one interactive signal generator, respectively.

It is another aspect of this invention to provide a method and the corresponding system for transmitting data over a network to at least one client including the step of fragmenting said data into K data segments each requiring a time T to transmit over the network, wherein each of the K data segments contains a head portion and a tail portion, and the head portion contain a portion of data of the tail portion of the immediate preceding segment to facilitate merging of the K data segments when received by the client.

The K data segments may be generated by a signal generator.

It is yet another aspect of this invention to provide a method and the corresponding system for transmitting data over a network to at least one client having a latency time to initiate transmission of said data to the client, including the steps of:
- generating at least one anti-latency data stream containing at least a leading portion of data for receipt by the client;
- pre-fetching the leading portion in the client as pre-fetched data; and
- generating at least one interactive data stream containing at least a remaking portion of said data for the client to merge into the leading portion.

This invention also provides a method and the corresponding system for transmitting data over a network to at least one client including the steps of generating a plurality of anti-latency data streams, in which the anti-latency data streams include:
- a leading data stream containing at least one leading segment of a leading portion of said data being repeated continuously within the leading data stream; and
- a plurality of finishing data streams, each of the finishing data streams:
  - containing at least the rest of the leading portion of said data; and
  - repeated continuously within said finishing data stream, and wherein each successive finishing data stream is staggered by an anti-latency time interval.

This invention further provides a method and the corresponding system for transmitting data over a network to at least one client. The method includes the steps of generating M anti-latency data streams from 1 to M, wherein an $m^{th}$ anti-latency data stream has $F_m$ segments, and $F_m$ is an $m^{th}$ Fibonacci number; and wherein said $F_m$ segments are repeated continuously within the $m^{th}$ anti-latency data stream.

It is yet another aspect of this invention to provide a method and the corresponding system for transmitting data over a network to at least one client, said data being fragmented into K segments each requiring a time T to transit over the network. The method includes the steps of generating M anti-latency data streams containing 1 to K anti-latency data segments, wherein the anti-latency data segments are distributed in the M anti-latency data streams such that an $k^{th}$ leading segment is repeated by an anti-latency time interval $\leq kT$ within the anti-latency data streams.

This invention further provides a method for receiving data being transmitted over a network to at least one client. The data to be transmitted is fragmented into K segments each requiring a time T to transmit over the network. The data is divided into two batches of data streams, the anti-latency data streams include M anti-latency data streams, and the interactive data streams includes N interactive data streams. The method for receiving the data includes the steps of:
- raising a request for said data. The request may be raised by a processor of the client; and
- connecting the client to the M anti-latency data streams and receiving data in the M anti-latency data streams. The client or the receiver may connect to the anti-latency data streams by a connector.

This invention also provides a method and a corresponding system for receiving data being transmitted over a network to at least one client, wherein said data includes a leading portion and a remaining portion, and the remaining portion is transmitted by at least one interactive data steam including the steps of:
- pre-fetching the leading portion in the client as pre-fetched data, which is contained in the buffer of the client; and
- merging the pre-fetched data to the remaining portion by a processor.

Further embodiments and options of the above methods and systems will be described in the following sections, and may then be apparent to one skilled in the art after reading the description.

BRIEF DESCRIPTION OF THE DRAWINGS

Preferred embodiments of the present invention will now be explained by way of example and with reference to the accompany drawings in which:

FIG. 8 shows the data streams arrangement of Group I data streams of Configuration 4 of the data transmission system of this invention.

FIG. 9 shows yet another arrangement of Group I data streams of Configuration 4 of the data transmission system of this invention.

DETAIL DESCRIPTION OF PREFERRED EMBODIMENTS

This invention is now described by ways of example with reference to the figures in the following sections. Even though some of them may be readily understandable to one skilled in the art, the following Table 1 shows the abbreviations or symbols used through the specification together with their meanings so that the abbreviations or symbols may be easily referred to.

TABLE 1

Abbreviations and Symbols Used

| Abbreviation/Symbol | Meaning |
| --- | --- |
| VOD | Video-on-Demand |
| NVOD | Near Video-on-Demand |
| QVOD | Quasi Video-on-Demand |
| DINA | Distributed Interactive Network Architecture, as described in PCT applications nos. PCT/IB00/001857 & 1858 |
| VCR | Video Cassette-Recorder |
| STB | Set-Top-Box |
| DDVR | Diskless Digital Video Recorder, the client of the system |
| IVOD | Instant Video-on-Demand, possible name of the system of this invention |
| J | no. of anti-latency data segments in an individual anti-latency data stream (in Configurations 1 to 3) or no. of data segments of the leading portion of the data to be transmitted (Configuration 4) |
| K | no. of data segments of the data to be transmitted |
| M | no. of anti-latency (Group I) data streams |
| N | no. of interactive (Group II) data streams |
| Q | amount of data to be transmitted |
| R | time required to transmit Q data over the network |
| S | amount of data in each data segment |
| T | time required to transmit each data segment over the network |
| A | no. of data streams in Group I(1) streams |
| C | no. of data segments in the data of Group I(1) streams |
| B | no. of data streams in Group I(2) streams |
| D | no. of data segments in the data of Group I(2) streams |
| E | no. of data segments in the coarse jump interval |

Although the following description refers to the data to be delivered as being video, it is expressly understood that data in other forms may also be delivered in the system of this invention, for example audio or software programs, or their combination. For instance, this invention may be used for deploying an operating system software to a large number of clients through a network upon request, Further, this invention may be utilised in data transmission systems handling a large amount of data with repetitive content, for instance in a video system bus of a computer handling many compli-cated but replicated 3D objects. Moreover, this invention may not be limited to the transmission of digital data only.

In this invention, a multi-stream multicasting technique is used to overcome the existing problems in VOD systems as described in the Background section. By using this technique, the users are allowed VCR-liked interactivity without the need to add a storage unit at the STB and caching all the content that may be viewed by tide user on a daily basis.

Figure 1:
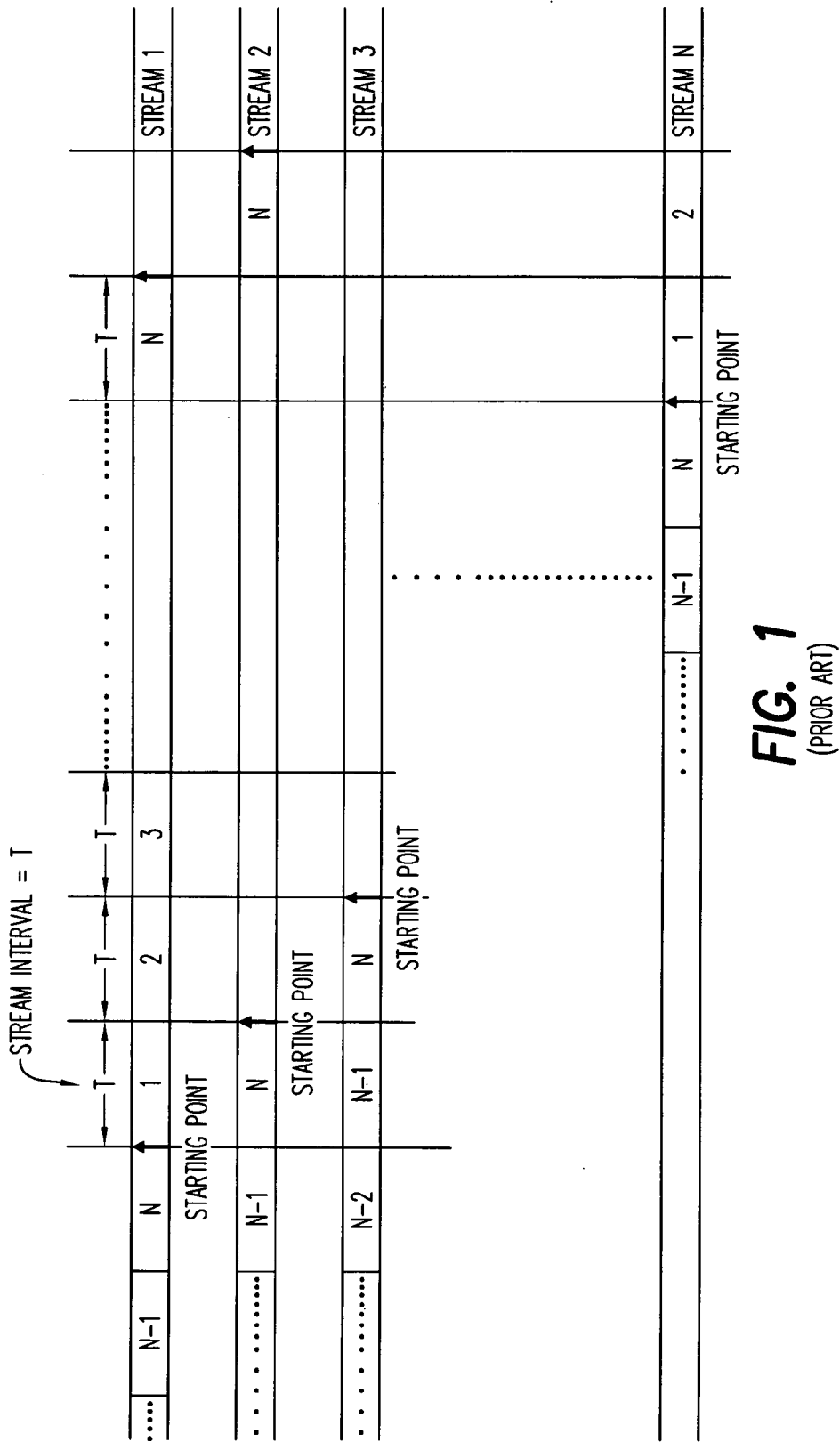
FIG. 1 shows the data stream structure of a NVOD system.
Figure 2:
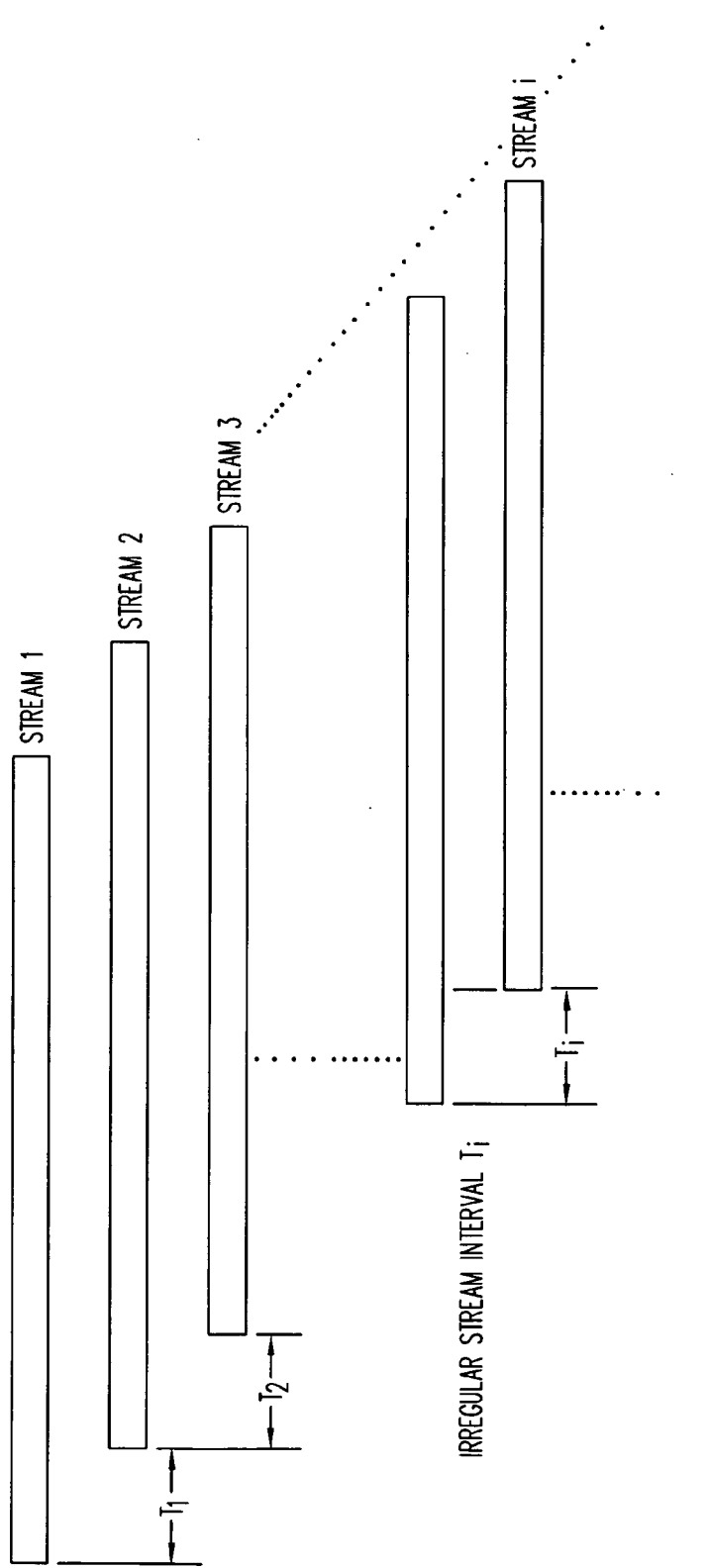
FIG. 2 shows the data stream structure of a QVOD system.
Figure 3:
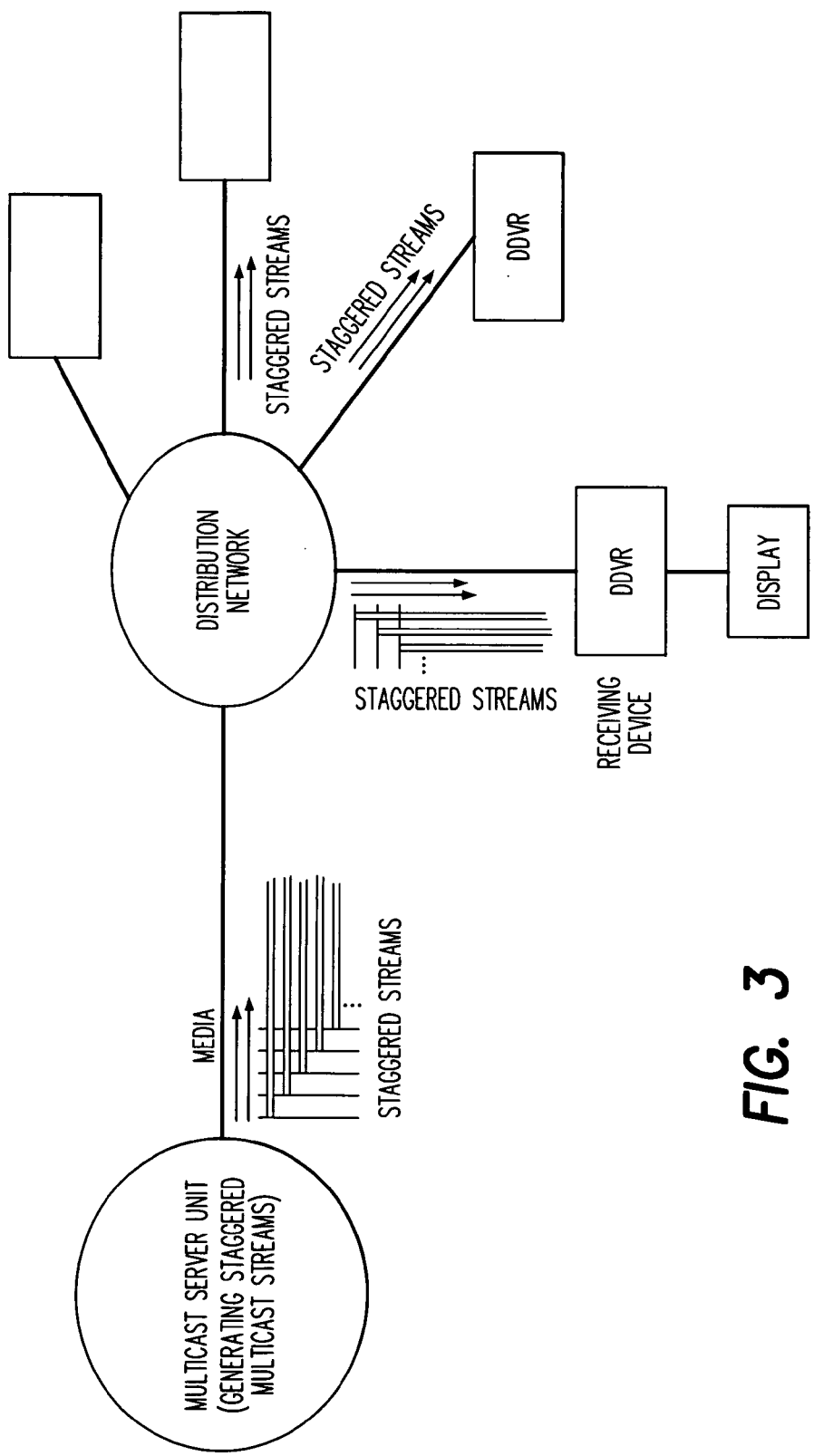
FIG. 3 shows the overall system architecture of the data transmission system of this invention.

FIG. 3 shows the system configuration. The multicast streams are generated from a multicast server unit. The streams are multiplexed onto the physical media and distributed to the end users through a distribution network. At each user end, there is a set top box (STB), such as DDVR, that selects a multitude of streams for processing. By arranging the content to be carried on the streams in a desired manner (as shown later in FIGS. 4–10), the start-up latency may be minimized while the users are provided with interactive functions. The DDVR should have sufficient bandwidth, buffer and processing capability to handle the multi-streams.

The data transmission system of this invention, which may be called an IVOD system, may look similar to the NVOD system. However, the IVOD and NVOD systems are differentiated by the following points:

1. how the content is put on the staggered streams,
2. how the staggered streams are generated,
3. how the DDVR selects and processes the multitude of staggered streams to restore the content.

The word "staggered" used above and throughout the specification in describing the data streams refers to the situation that each of the data streams begins transmission at different times. Therefore, two "frames" of two adjacent data streams, in which the term "frame" represents the repeating unit of each data stream, are separated by a time interval.

In the broad sense, the data transmission method and system may be described as providing two groups of data streams Group I and II. Group I data streams, which may be term anti-latency data streams, may serve to reduce latency for starting-up the transmission of the required data. Group I data streams may be generated by at least one anti-latency signal generator. Group II data streams, which may be termed interactive data streams, may serve to provide the desired interactive functions to the users. Group II data streams may be generated by at least one interactive signal generator. For the interactive actions provide by Group II data streams, this can be referred to the applicant's PCT applications nos. PCT/IB00/001857 & 1858, the contents of which are now incorporated as references therein. The operation of the interactive functions is not considered to be part of the invention in this application and the details will not be further described here.

The operation of the IVOD system can best be illustrated by the following examples. Each of these examples is a valid IVOD system but they all differ in details with various tradeoffs. These examples only intend to show the working principles of IVOD systems and are not meant to describe the only possible ways of IVOD operation.

In the following examples, the content to be transmitted having a total amount of data Q requires a total time R to be transmitted over the network. The content, for example, may be a movie. The Q data is broken up into K segments each having an amount of data S. Each data segment requires a time T to be transmitted over the network. Q and S may be in the unit of megabytes, while R and T are units of time. For the sake of convenience, the data segments of the Q data are labelled from 1 to K respectively. Therefore, $$K = \frac{R}{T}.$$

The Q data may be divided into a leading portion and a remaining portion. In most cases, the Group I anti-latency data streams may contain the leading portion only. The Group II interactive data streams may contain the remaining portion or the whole set of the Q data, and this may be a matter of design choice to be determined by the system manager.

It should be noted that the system may still work if the individual data segment contains different amounts of data than each other, provided that they all required a time T for transmission. This may be achievable by controlling the transmission rate of the individual data segment. However, individual data segments may be preferred to have same amount of data S for the sake of engineering convenience. On the other hand, it may be relatively more difficult to implement the system for each of the data segments to have same amount of data S but with different transmission times.

Although the following description refers to the transmission of one set of data, for instance, a movie, it should be apparent to one skilled in the art that the method and system may also be adapted to transmit a certain number of sets of data depending on, for example, the bandwidth available.

A. Dual Streaming IVOD System (Configuration 1)

The simplest IVOD system is characterized by a dual-streaming operation. Dual streaming means that each user will tap into at most two of the multicast data streams at any time. Most of the time, the user may only be tapping into one data stream.

Figure 4:
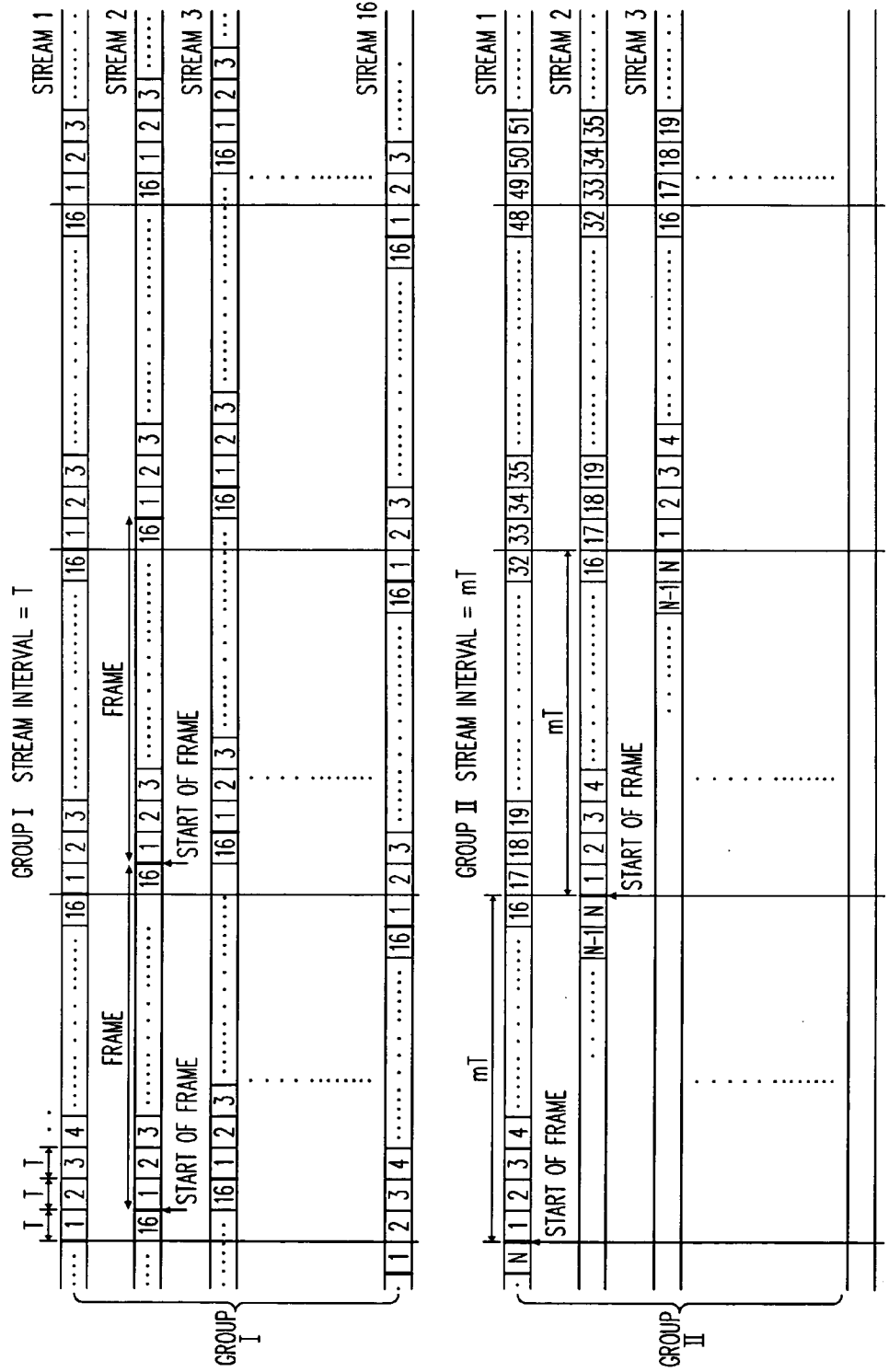
FIG. 4 shows the data streams arrangement of Configuration 1 of the data transmission system of this invention.

The segments are put onto the staggered streams as shown in FIG. 4. There are two groups of staggered streams. For Group I anti-latency data streams, there are J segments on each frame. T is the anti-latency time interval and may also be the upper bound for the start-up latency of the IVOD system. Each anti-latency data stream is preferably staggered by the anti-latency time interval T, although the anti-latency time interval may be set at any desired value other than T.

In this particular example, J is equal to 16 and T is 30 seconds. So the frames in each of the Group I data streams repeat themselves after a time of JT being 8 minutes. There are a total of M streams in Group I.

For Group II interactive data streams, there are N interactive data streams, with each of them being staggered by an interactive time interval. Although the interactive time interval may again be set at any desired value, the interactive time interval is preferably to be JT (i.e. 8 minutes in this example) for the sake of engineering convenience, Assuming the length of the content is R (say R equals to 120 minutes), then there should be at least a total of $$\frac{R}{JT} = 15$$

streams in Group II. N may be larger than this value but this may create unnecessary network load.

When a user starts to view the content at time $t_i$, the DDVR at the user end will select one stream from Group I (Stream Ii) and one stream from Group II (Stream IIj) to tap into. Once the client connects to Streams Ii and/or IIj, the data streams are processed by the DDVR, the client, and the segments are buffered according to the segment sequence number. The availability of the Group I staggered streams with stream interval T minimises the start-up latency to be equal to T.

Alternatively, the user or the client may tap into Stream Ii only and await all of the data in the leading portion to be received by the client before tapping into Stream IIj. After the DDVR has latched onto a Group I stream, the DDVR will immediately look for a suitable Group II stream for merging. In this particular case, each Group II data streams may preferably contain only the remaining portion of the Q data.

The method on merging of data streams can be found in the DINA technology. After merging, the Group I stream may no longer be needed and the DDVR may then rely solely on Stream IIj for subsequent viewing. This may be the optimised alternative only to minimise network load.

It should be noted that once the system has started, the user could initiate the following interactive requests, including pause and resume, rewind, and slow motion playback. However, forward and backward jumps may be restricted to jump to any one of the Group I or Group II streams (at any particular time). This problem may be resolved by fine-tuning the parameters of the system. For instance, Group I data streams may be designed to contain content that relatively few people wish to look at, like copyright notices.

The total number of streams in this type of IVOD system is $$M + \frac{R}{JT}.$$

The optimal system configuration is calculated to be $$M = N = J = \sqrt{\frac{R}{T}},$$

and the optimal total number of streams is given by $$2\sqrt{\frac{R}{T}}.$$

B. Dual Streaming IVOD System (Configuration 2)

Figure 5:
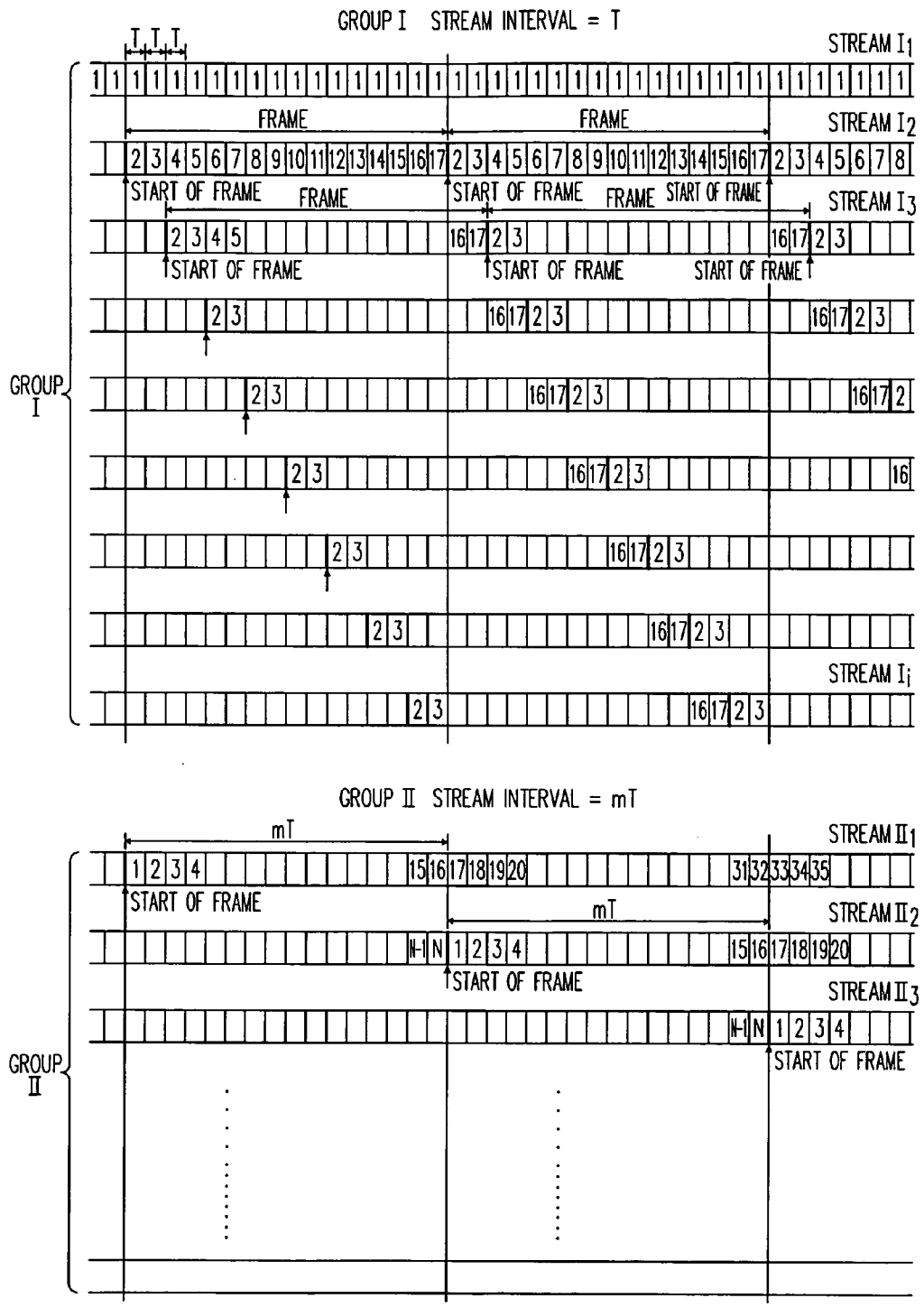
FIG. 5 shows the data streams arrangement of Configuration 2 of the data transmission system of this invention.

The second example of IVOD system is also characterised by a dual-streaming operation. Again, the content is broken up into K segments of regular length T, and the segments are labelled from 1 to K respectively. The segments are put onto the staggered streams in a pattern as shown in FIG. 5.

In this configuration, there are also two groups of staggered streams. For Group I anti-latency data streams, there are J segments on each frame and the frames are repeated on each stream. In this example, J is again chosen to equal to 16 and T is 30 seconds. This configuration characterises in that one of the Group I data streams, Stream I1, contains only Segment 1 repeated in all time slots. Streams I2 to I9 contain Segment 2 to 17. In another words, Segment 1 may be viewed as a leading data steam containing the leading segment of the leading portion. Segments 2 to 9 may be considered as a plurality of finishing data streams containing the rest of the leading portion in the number of J segments. The Group I stream interval may be chosen to be any desired value, but is again preferably set to be T due to same reason as in Configuration 1. Streams I2 to I9 repeat themselves after JT (i.e. 8 minutes in this example).

In this particular example, there should be at least a total of $$M = \frac{J}{2} + 1$$

streams in Group I for the smooth merging of the leading data stream and the finishing data stream. M may be less than this value but then the user may suffer from the phenomenon of "dropping frames". M may be larger than this value but this may create unnecessary network load. This may be a matter of design choice that should be left to be determined by the system administrator.

Although the leading segment shown in FIG. 5 contains only one leading segment, it should be understood that the leading data stream may contain more than one leading segment, for example, segments 1–4. The above conditions of the Group I anti-latency data streams of this Configuration 2 may then be viewed as T being four times as long, while this change may not affect the Group II interactive data streams. In such cases, the user may suffer from a larger start-up latency. On the other hand, M may be substantially reduced and could be $$M = \frac{J}{8} + 1$$

for the smooth merging of the leading data stream and the finishing data stream. Although this may be less desirable, this may be again a matter of design choice that should be determined by the system administrator.

For Group II streams, the arrangement and the set up of the streams may be the same as in the previous example, and the same setting and variations is also applicable to this application.

When a user starts to view the content at time ti, the DDVR at the user end will immediately tap onto Stream I1. The start-up latency should be bounded to T as the leading segment is repeated every time period T. After all data in the leading segment is received, the DDVR will also tap onto one of the Group I finishing data streams, I2 to I9 in this case. For the ease of illustration, Stream Ii is chosen. As an alternative, the DDVR may tap onto the leading data stream and one of the finishing data streams simultaneously if the DDVR is capable of doing so. In the latter case, both streams are processed by the DDVR and the segments are buffered according to the segment sequence number.

The DDVR will also tap onto one of the Group II streams (in this case Stream II2). The time at which the DDVR taps onto the Group II streams is a matter of choice—it may do so:

1. immediately after tapping onto the leading data stream Stream I1
2. immediately after tapping onto one of the finishing data streams
3. after all data in the leading portion contained in Group I data streams is received by the DDVR Generally, the DDVR should tap onto one of the Group II streams at least right before all data in Group I streams is received or played by the client.

After all data in the Group I data streams has been buffered and received, the DDVR then merge onto one of the Group II streams. The merging technique is described in the DINA technology. After merging, the Group I stream (i.e. Stream Ii) may no longer be needed and the DDVR may rely only on the Group II stream for subsequent viewing to save bandwidth. Any allowable interactive request received at any time can be entertained as previously shown in the DINA technology.

The total number of streams in this IVOD system is $$\left(\frac{J}{2} + 1\right) + N.$$

As N preferably equals to $$\frac{R}{JT},$$

the optimal configuration is given by $$J = \sqrt{2K} = \sqrt{\frac{2R}{T}}$$

and the optimal total number of data streams of the system is equal to $$\sqrt{2K} + 1 = \sqrt{\frac{2R}{T}} + 1.$$

C. Dual Streaming IVOD System (Configuration 3)

Figure 6:
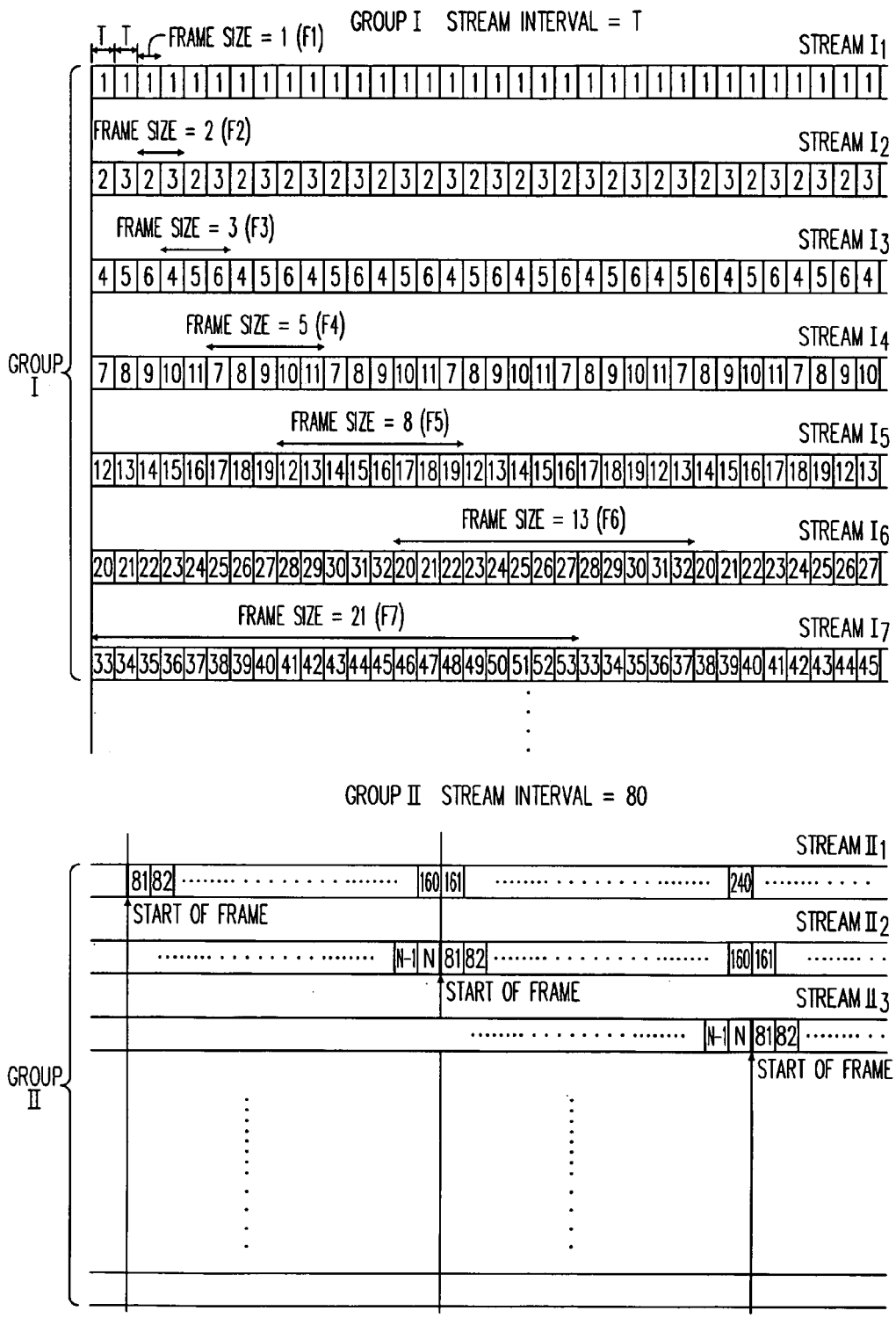
FIG. 6 shows the data streams arrangement of Configuration 3 of the data transmission system of this invention. Note the difference in the arrangement of the Group II data streams comparing with FIGS. 4 & 5.

The third example of IVOD system is also characterised by a dual-streaming operation with the segments arranged in a hierarchical periodic frame structure with a size based on the Fibonacci numbers. Again, the content is broken up into K segments of regular length T, and the segments are labelled from 1 to N respectively. The segments are put onto the staggered streams in a pattern as shown in FIG. 6. There are also two groups of staggered streams.

In this configuration, Group I data streams contains the data in the leading portion having J segments. Note that this J is slightly different from those used in Configurations 1 and 2. There are M Group I data streams labelled from 1 to M. For each of the Group I stream $I_m$, where m is an integer representing the stream number, the frame period is given by $F_m$ where $F_m$ is the m-th Fibonacci number. The first few Fibonacci numbers are shown in Table 2. The Fibonacci numbers have the property that $F_y = F_{y-1} + F_{y-2}$, where y is an integer starting from 3. The Group I stream interval is again preferably set to be T as in Configurations 1 and 2. There are 12 Group I streams in this example. For Group II streams, the arrangement and the set up of the streams arc similar to the previous examples, but for the sake of illustration, the Group II streams starting at Segment 81.

TABLE 2

Fibonacci numbers.

| j  | 1 | 2 | 3 | 4 | 5 | 6  | 7  | 8  | 9  | 10 | 11  | 12  |
|----|---|---|---|---|---|----|----|----|----|----|-----|-----|
| Fj | 1 | 2 | 3 | 5 | 8 | 13 | 21 | 34 | 55 | 89 | 144 | 233 |

The principle of operation can best be explained by the following even though many different variations are possible. When a user starts to view the content at time t, the DDVR at the user end will immediately tap onto two Group 1 data Streams I1 and I2. Both Segment 1 from Stream I1 and Segment 2 or 3 from Stream I2 will be buffered. Now there are two segments in the buffer, and Stream I2 has a frame size of 2, Stream I2 can be smoothly merged into using the methodology as described in the DINA technology. Thus, the startup latency should be bounded to T. After Segment 1 has been received, DDVR will tap onto Streams I2 and I3. Since there are only two segments in Stream I2, Segment 3 will either be buffered during the time when Segment 2 is being received, or Segment 3 will be available on Stream I2 immediately following Segment 2's completion. After both Segments 2 and 3 have been received out, the DDVR will tap onto Streams 3 and 4, and the process continues as before. Both streams are processed by the DDVR and the extra segments are buffered according to the segment sequence number.

In the above discussion, the DDVR is presumed to connect to the $1^{st}$ and $2^{nd}$ data streams for starting-up the movie such that the latency is bounded to be T. However, if the user wishes, he may choose to first tap onto the $m_{th}$ and $(m+1)^{th}$ data streams, wherein m is any number larger than 1. The user can still view the content but may be suffering from larger latency. This may be preferred by some users who wish to skip the first few minutes of a movie, for example.

By constructing the frame period of the streams according to the Fibonacci number $F_m$, after Stream $I_{m-1}$ has been received, the DDVR would have buffered at least $F_m = F_{m-1} + F_{m-2}$ time slots. Using the merging methodology as described in the DINA technology, Stream $I_{m-1}$ can be smoothly merged into Stream $I_m$ as the frame size of Stream $I_m$ is exactly $F_m$.

It is noted that after m segments are received, exactly m more segments would have been buffered because of the dual streaming arrangement. The DDVR preferably begin to merge onto one of the Group II streams, at the very least to save bandwidth, once the number of segments buffered has exceeded the size of the Group II stream interval (in this case 80 segments are needed for an 8-minute Group II stream interval). After merging, the Group I stream (i.e. Stream Ii) may no longer be needed and the DDVR may rely only on the Group II stream for subsequent viewing. Any allowable interactive request received at any time can be entertained as described in the DINA technology.

There is no optimal parameter for this Configuration. To save bandwidth, there should be no Group II data stream. However, users may only be able to enjoy limited interactivity depending on how much of the data is received and buffered in the DDVR. Specifically, the user may perform pause, resume, rewind, slow motion, and backward jump, but the user may not be able to perform fast forward and forward jump functions.

The number of Group I data stream required, M, is determined by the number of Group II data streams, which is in turn to be determined manually according to various system factors. With a given start-up latency T, the total number of streams required in this IVOD system can be found by looking up the necessary frame size from a table containing the relevant Fibonacci numbers. The minimal number of data streams should be M such that $$F_M \geq \frac{2K}{N}$$

for the smooth merging between the individual Group I data streams. M may be less than this value but then the user may suffer from the phenomenon of "dropping frames". M may be larger than this value but this may create unnecessary network load. This may be a matter of design choice that should be left to be determined by the system administrator.

Using this technique, the start-up latency T can be as low as 6 seconds (with an average of 3 sec), with a Group II stream interval of 8 minutes. The total number of streams required for a 2-hour content can be as low as only 26.

Figure 7:
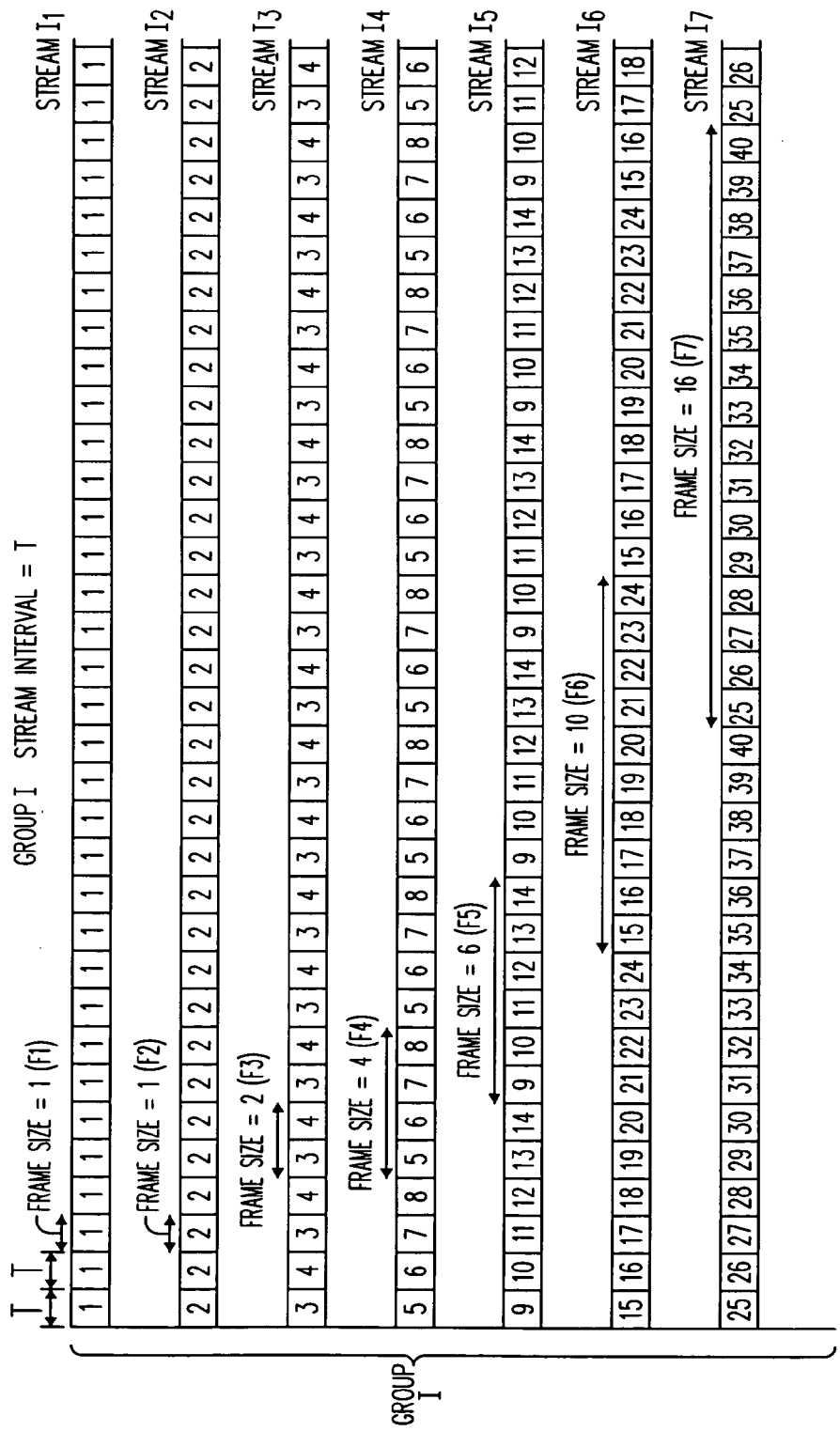
FIG. 7 shows yet another Group I data streams arrangement of Configuration 3.

An alternative arrangement for the Group I streams is shown in FIG. 7. Note that the frame structure of the streams only follows the Fibonacci sequence after Stream 4.

D. Multi-Streaming IVOD System (Configuration 4)

The previous three examples show several possible implementations of the IVOD systems with dual-streaming. In fact, there are many more possible implementations of the IVOD system, each depending on a different arrangement of the segments in different streams, and on the maximum number of streams that the end user DDVR must simultaneously tap into and process. The above three examples are relatively simple to understand and implement, but the number of streams used are not optimal because of the restriction that only two maximum streams are tapped into and processed at any given time. In the current configuration, a multi-streaming IVOD system with the optimal number of streams is demonstrated.

Figure 8:
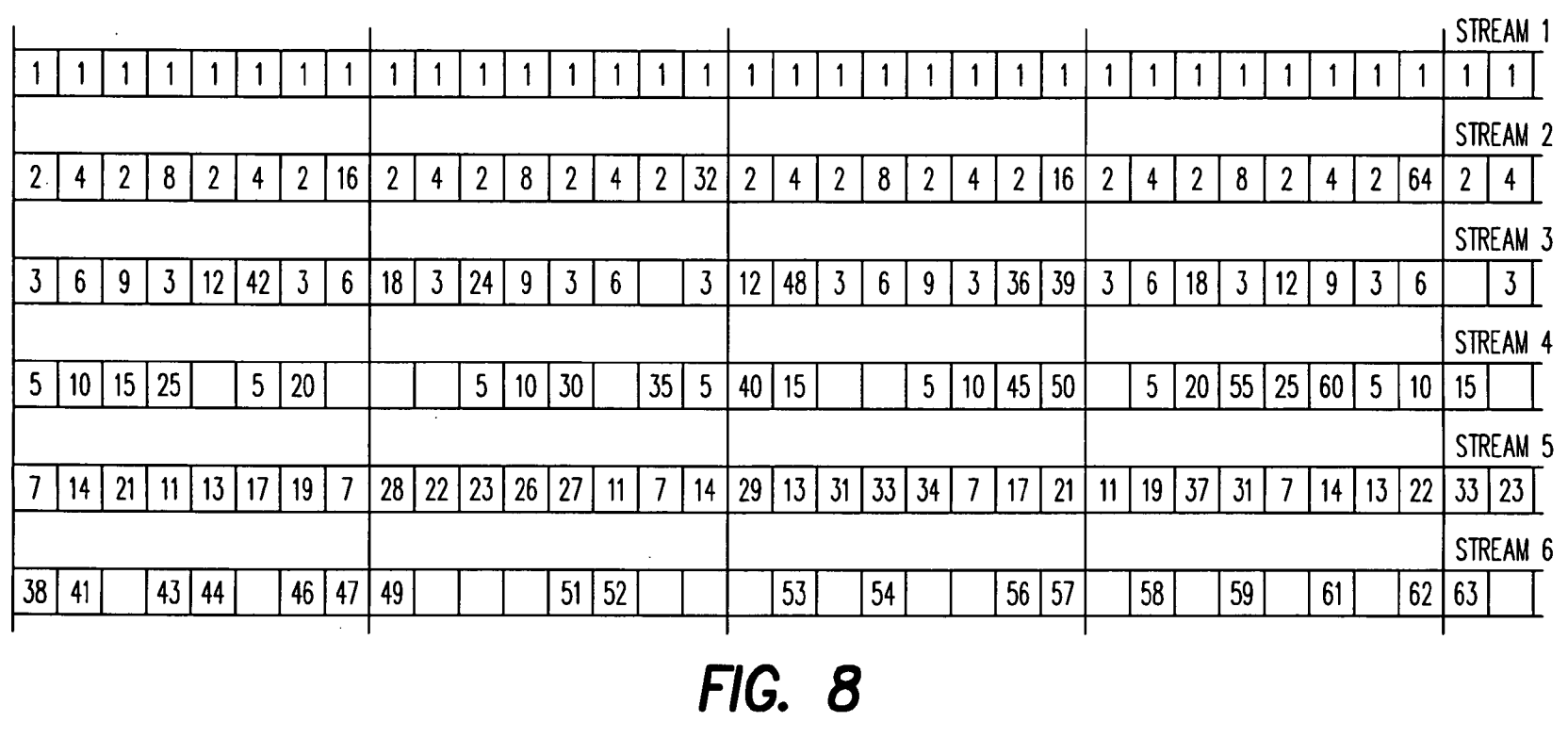

This configuration is realized with the assumption that all the streams that carried the content are all tapped into and processed by the end user DDVR. FIG. 8 shows a possible optimal arrangement of the initial thirty segments or so in various streams based on the harmonic series approach. The segments are labelled 1, 2, 3, ... etc. ... The necessary and sufficient condition for guaranteeing the start up latency to be bounded within one slot interval using only an optimal number of streams is that the placement of the segments should be done in such a way that Segment j (i.e. the j-th segment from the beginning of the leading portion) should be repeated in every j time slots or less, for all j from 1 to J. For example, Segment 1 should be repeated in every time slot in order that the start-up latency is bounded within one anti-latency interval T. Therefore, there may be a whole stream taken up by Segment 1 alone. Segment 2 should be repeated in every other time slot in order that the second segment is available immediately after the first segment has been received. Similarly Segment 3 should be repeated in every three time slots and Segment j should be repeated in every j time slots. For j>1, the segment j may be repeated more frequently than required. That is, the $j^{th}$ segment is repeated by an anti-latency time interval $\leq jT$. Note that the definition of the term "anti-latency time interval" in this Configuration 4 is different from that in Configurations 1 to 3.

The exact stream where the segments are placed does not matter as we are assuming that all streams are being received and processed by the DDVR. The segments are buffered by the DDVR and rearranged into a suitable order. The unfilled slots in FIG. 9 can contain any data or even be left unfilled.

As in Configuration 3, there is no optimal parameter for this Configuration. To save bandwidth, there should be no Group II data stream, in which users may may only be able to enjoy limited interactivity depending on how much of the data is received and buffered in the DDVR. This may not be desirable. The number of Group I data stream required, M, is determined by the number of Group II data streams, which is in turn to be determined manually according to various system factors. The total number M of streams required for carrying the J time slots can be found by summing the harmonic series from 1 to J, such that $$M \geq \sum_{j=1}^{j=J} \left(\frac{1}{j}\right).$$

This is approximately equal to $\gamma+\ln(J)$, where $\gamma$ is the Euler's constant (~0.5772 . . . ) when J is large. Even though J can be set to any desired number larger than $$\frac{K}{N},$$

for the sake of engineering convenience, it is preferred to have $$J = \frac{K}{N},$$

which equals to the number of data segments in the interactive time interval. This is the optimal number of streams required to bind the start-up latency to within one slot interval.

To create an IVOD system based on this optimal multi-streaming condition, the streams are again divided into two groups, Groups I and II. The segment arrangements of the Group I streams has been shown in FIG. 8. The segment arrangements of the Group II streams are same as those shown in any one of FIGS. 4 to 6. When a user initiates a viewing request, all of the Group I streams should be received and processed by the DDVR. In addition, a suitable Group II stream will also be tapped into and processed. This allows a smooth merging of the Group I streams (where the initial m segments are placed) into a single Group II stream. As an alternative, the tapping onto the Group II stream may await until all data in the leading portion contained in Group I streams is received by the client DDVR.

After one Group II stream interval (which is again set to be JT intentionally in this case), all the Group I streams may no longer be needed and only a single Group II stream is needed for the continuous viewing by the user. Like before, through the use of a plurality of Group II streams, once the system has started, the user could initiate any of the allowable interactive requests, including pause and resume, rewind, and slow motion playback.

As in configuration 3, it is possible to create an IVOD system entirely based on the group I streams as illustrated previously. By doing that, the number of streams can be reduced with minimised start-up latency. However, users of such systems may be restricted to limited interactivity, as discussed in Configuration 3. Furthermore, the buffer size at the DDVR must be as large as the entire content, and the processing capability of the DDVR is more demanding for the current configuration. The decision regarding which system to deploy should be left as an option to the service provider.

It should further be noted that this multi-streaming arrangement may be used to replace the Fibonacci stream sequences (Group I streams) in Configuration 4 to further reduce the number of streams required. The condition is that the DDVR should have enough buffer and processing power to buffer and process the received data. Table 3 in the up-coming section lists some results in all various configurations.

Figure 9:
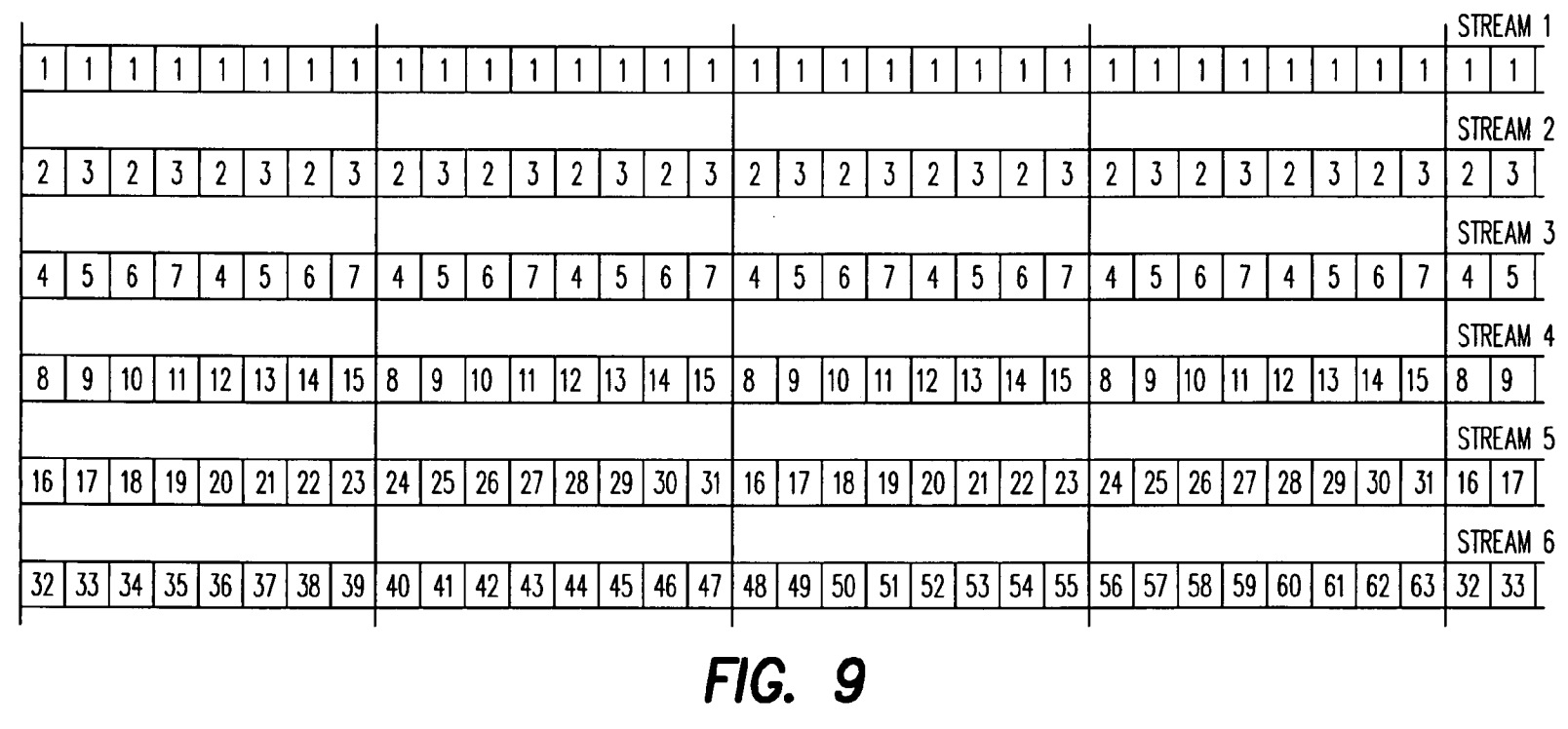

A non-optimal multi-streaming arrangement known as the logarithmic streaming is shown in FIG. 9.

E. Mixed Dual-Dual/Multi-Dual Streaming IVOD System (Configuration 5)

Configurations 3 and 4 demonstrate an IVOD system with a very short start-up latency in comparison with Configurations 1 and 2 using a comparable numbers of streams. But Configuration 1 or 2 also has an advantage over Configuration 3 or 4—they allow coarse jumping from stream to stream during the first stream interval while Configuration 3 or 4 does not. In real life, the first few minutes of a content source usually contain a lot of header and information that many users may want to slip by jumping. Therefore, it is desirable to provide at least a limited jump capability for the users.

By combining Configuration 1 or 2 and 3 or 4, one may create an IVOD system with a limited jump capability even without the help of an external unicast stream. This IVOD system contains three groups of staggered streams, namely, Group I(1) and I(2). Group I(1) data streams has a total number of A data streams responsible for distributing data having C segments. Similarly, Group I(2) data streams has a total number of B data streams responsible for distributing data having D segments, with each of the B data streams being staggered by a coarse jump interval. There are E data segments in the coarse jump interval.

To give a more concrete example, let us assume a segment size T of 6 seconds. Let Group I(1) contain the first 7 Fibonacci streams as shown in Configuration 3. Let Group I(2) contain the 8 Group I streams as shown in Configuration 1 running from Segment 11 to 90, with a staggered stream interval of 10 segments. Note that Group I(2) can contain data segments running from 1 to 90, although it may seem to be redundant. Accordingly, the frame period of Group I(2) streams is 80 segments or 8 minutes, and this is the coarse-jump frame period allowing the user to perform a coarse-jump interactive when the DDVR is connecting to the Group I data streams. Group II streams of Configuration 5 are identical to the Group II streams of the other configurations. In this particular example, each of the Group II streams starts from Segment 1 and going all the way to the end of the entire content. The arrangement of the streams and segments are shown in FIG. 10.

With this hierarchical arrangement of streams and segments, it can be seen that the user can start at any time with a start-up latency of one segment (6 seconds in this example). Furthermore, users can coarse jump at any time within the start-up period, the time when the DDVR connects to the Group I streams. The start-up period is preferably defined to be the time within the first Group II stream interval (that is, from the 0-minute point to the 9-minute point) as in previous configurations. Each coarse jump is 1 minute apart from each other, which is determined by the coarse-jump frame period. Thus, the users can skip the headers using this arrangement. The total number of streams needed for holding a two-hour content in the particular example shown in FIG. 10 is 30.

Figure 10:
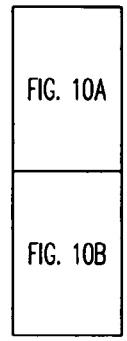
FIG. 10 shows one of the data streams arrangement of Configuration 5 of the data transmission system of this invention. The particular arrangement of Group I data streams shown in this figure combines Configurations 1 & 3.
Figure 10A:
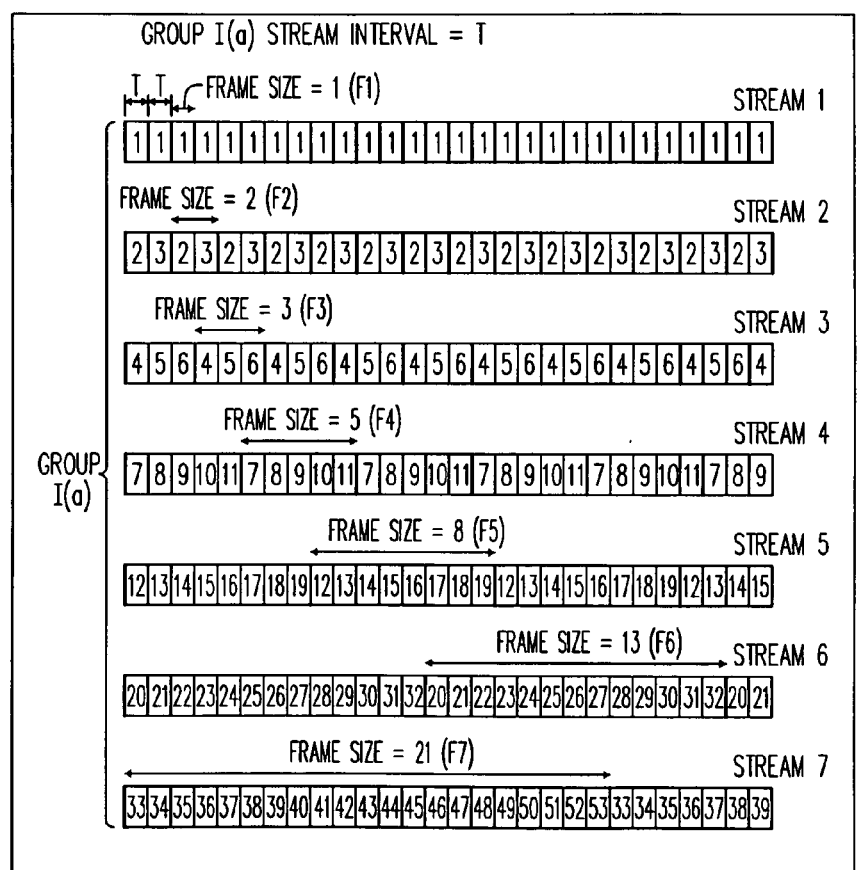

Although FIG. 10 only shows the combination of Configurations 3 and 1 in Group I data streams, it should be obvious to those skilled in the art that the following combinations are also possible:
  a. Configurations 4 and 1
  b. Configurations 3 and 2
  c. Configurations 4 and 2

The number of Group I(1) data streams required, i.e. A, may be determined by talking E as $$\frac{K}{N}$$

in configurations 3 and 4. That is, if Configuration 3 is used in Group I(1), there should be A data streams in Group I(1) such that $F_A \geq 2E$. If Configuration 4 is used, then $$A \geq \sum_{c=1}^{c=C} \frac{1}{c}.$$

As in Configuration 4, C, the total number of data segments to be transmitted in Group I(1), preferably equals to E. The same considerations on the number of data streams required as in Configurations 3 and 4 may also be applicable to Group I(1).

The decision regarding which combination to deploy should again be left as an option to the service provider.

Additional Features of Individual Data Segments

To facilitate the change over of the streams without incurring substantial loss of data during the transition, the beginning of each data segment, which can be termed the head portion, may contain duplicated data appearing in the tail portion of the immediate preceding segment. The amount of data to be carried in the duplicated portion may be T' (normalized with respect to the data rate of the stream), where T' is the delay that may incur during the change over of the streams. Typically, T' may be in the order of 10–20 milliseconds.

IVOD System Requirements

There are several system requirements:
  a. The server needs to generate the appropriate multi-streams in patterns that have been illustrated in any one of Configurations 1 to 5 or such patters as may be designed.
  b. The distribution network should have sufficient capacity to carry all the required streams to the end user DDVR.
  c. The end user DDVR should have sufficient bandwidth, buffer and processing capability to handle the multi-streams. The DDVR should also have sufficient storage to buffer at least one Group II stream interval of data from the multi-streams.

These factors may affect the service provide in choosing which configuration to deploy.

Concept of Diskless DVR

Generally, the receiver DDVR may have a processor for raising request for the content, and a connector for connecting the Group I and II data streams.

For Configurations 1 and 2, it may be necessary for the DDVR to include a buffer for buffering die received Group I data streams. For Configurations 3 and 4, the DDVR should include a buffer for buffering the data received from Group I data streams. The processor will then also be responsible for processing the data to put the data in a proper order.

With the multi-streaming concept, the receiving device, the receiver, at the user end may not need to have any hard disk storage. The only memory or buffer needed at the STB, the client/receiver, may be the RAM (random-access memory) to buyer one stream interval equivalent of data. Assuming a stream interval of 8 minutes, this requires roughly 60 MB of RAM for a 1 Mb/s MPEG-4 stream. This technique can be contrasted with many VOD techniques that require a large hard disk storage (sometimes as large as 60 GB) at the STB. Therefore, this IVOD system also appears to the users like a diskless DVR. However, the system provider may choose to provide addition storage to the users in the form of hard disk or other non-volatile medium or use such other equipment as may be necessary to buffer and receive the data.

It should be further noted that there might be several options for the DDVR.

First, the DDVR may be configured such that it plays the received data at a slower rate than the transmission rate of the data. The transmission rate may be expressed $$\frac{S}{T}$$

under the condition that each data segment contains same amount of data. In such cases, the DDVR may be required to have a larger buffer size to accommodate the un-received data.

Secondly, the DDVR may be configured to contain or pre-fetch at least a portion of the data in the Group I data streams, i.e. the leading portion of the data to be transmitted, for a certain period of time in its local buffer. Such data may be termed "pre-fetched data". If desired, the pre-fetched data may contain all of the data contained in the Group I data streams provided that the DDVR has adequate buffer size. In one extreme, the content of the data to be transmitted may be refreshed every day for video data, or more than once per day. In this particular example, it may be necessary for the pre-fetched data to be refreshed every day. The refresh time may be set at any desired value that may range from one day to even one year. It may be preferable to refresh the pre-fetched data during an off-peak period, like after midnight (for instance, from 01:00–06:00), or between 10:00 to 15:00, wherein the network activities resulting from clients' requests may be at a minimum. This process may be initiated by the anti-latency signal generator, the interactive signal generator, or by the client itself by a routine call procedure. In doing so, the latency time and the total number of data streams required in the network may be further reduced. This may be particularly important for VOD systems transmitting a large number of sets of data.

Trade-off of Space-Time-Bandwidth

There is a trade-off relationship for different configurations of the IVOD systems of this invention among buffer storage at DDVR (space), start-up latency (time) and streams (transmission bandwidth) required. This is shown in Table 3 and further illustrated in FIG. 13.

Figure 13:
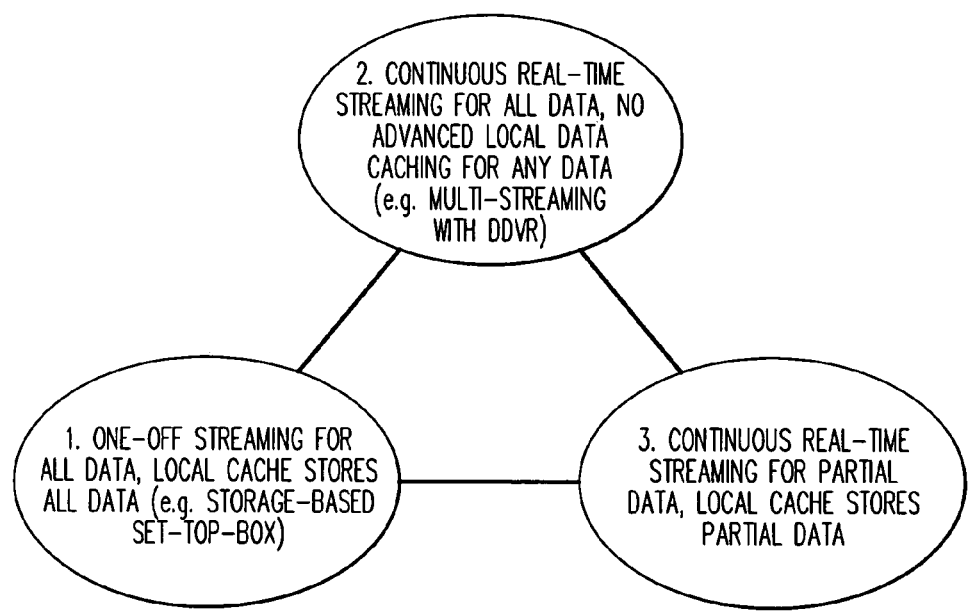
FIG. 13 shows the local storage versus transmission bandwidth trade-off relationship.

In FIG. 13, the Vertex 1 may be realised as current VOD systems with all the data being sent and then stored in the STB, whether the client raises a request for the data or not. In such a case, the STB should have a relatively large buffer size. This may increase the manufacturing costs of the STB.

Vertex 2 may represent the systems as described in Configurations 1–5. Under such a configuration, the requirement on the STB may be minimal while the system may be more demanding on the bandwidth.

Vertex 3 may represent a hybrid system of Vertexes 1 and 2.

The decision on which "Vertex" to choose may be a matter of design choice depending on various factors including the bandwidth available, the specification of the STB, local requirements on latency and interactivity, and so on.

TABLE 3

Tradeoff among Buffer Storage (Space), Startup Latency (Time) and Streams (Transmission Bandwidth) Required

| | | Number of Streams Required | | | | |
|---|---|---|---|---|---|---|
| | Staggered Interval | 6 min | 7 min | 8 min | 10 min | 15 min |
| | Content Size L = 1 hr | | | | | |
| Dual-Streaming | Configuration (1) T = 30 sec (coarse jump = 1 minute) | 22 | 23 | 24 | 26 | 34 |
| | Configuration (2) T = 30 sec (coarse jump = 2 minutes) | 17 | 17 | 17 | 17 | 20 |
| | Configuration (3) T = 6 sec (no coarse jump allowed) | 20 | 19 | 18 | 17 | 16 |
| | Configuration (5) T = 6 sec (coarse jump = 1 minute) | 23 | 23 | 23 | 23 | 26 |
| | Configuration (5) T = 6 sec (coarse jump = 2 minute) | 22 | 22 | 21 | 20 | 21 |
| Multi-Streaming Configuration (4) | Optimal Configuration = T 6 sec (no coarse jump allowed) | 15 | 14 | 13 | 12 | 10 |
| | Optimal Configuration T = 6 sec (coarse jump = 1 minute) | 20 | 20 | 20 | 20 | 23 |
| | Optimal Configuration T = 6 sec (coarse jump = 2 minute) | 18 | 18 | 17 | 16 | 17 |
| | Content Size L = 2 hr | | | | | |
| Dual-Streaming | Configuration (1) T = 30 sec (coarse jump = 1 minute) | 32 | 31 | 31 | 32 | 38 |
| | Configuration (2) T = 30 sec (coarse jump = 2 minute) | 27 | 25 | 24 | 23 | 24 |
| | Configuration (3) T = 6 sec (no coarse jump allowed) | 30 | 27 | 26 | 23 | 20 |
| | Configuration (5) T = 6 sec (coarse jump = 1 minute) | 33 | 31 | 30 | 29 | 32 |

TABLE 3-continued

Tradeoff among Buffer Storage (Space), Startup Latency (Time) and Streams (Transmission Bandwidth) Required

| | | Number of Streams Required | | | | |
|---|---|---|---|---|---|---|
| | Staggered Interval | 6 min | 7 min | 8 min | 10 min | 15 min |
| Multi-Streaming Configuration (4) | Configuration (5) T = 6 sec (coarse jump = 2 minute) | 32 | 30 | 28 | 26 | 25 |
| | Optimal Configuration T = 6 sec (no coarse jump allowed) | 25 | 22 | 20 | 18 | 14 |
| | Optimal Configuration T = 6 sec (coarse jump = 1 minute) | 31 | 29 | 27 | 27 | 28 |
| | Optimal Configuration T = 6 sec (coarse jump = 2 minute) | 28 | 26 | 24 | 22 | 21 |

Application to Cable, Satellite and Terrestrial Broadcasting Systems

The IVOD systems of this invention may find immediate applications in existing cable TV, terrestrial broadcasting, and satellite broadcasting systems. With very little modification on the existing infrastructure, the non-interactive broadcasting, or NVOD systems may be converted into an IVOD system. Both analogue and digital transmission systems can take advantage of the multi-steaming concept. However, the discussions below will only describe system configurations for digital transmission systems.

Figure 11:
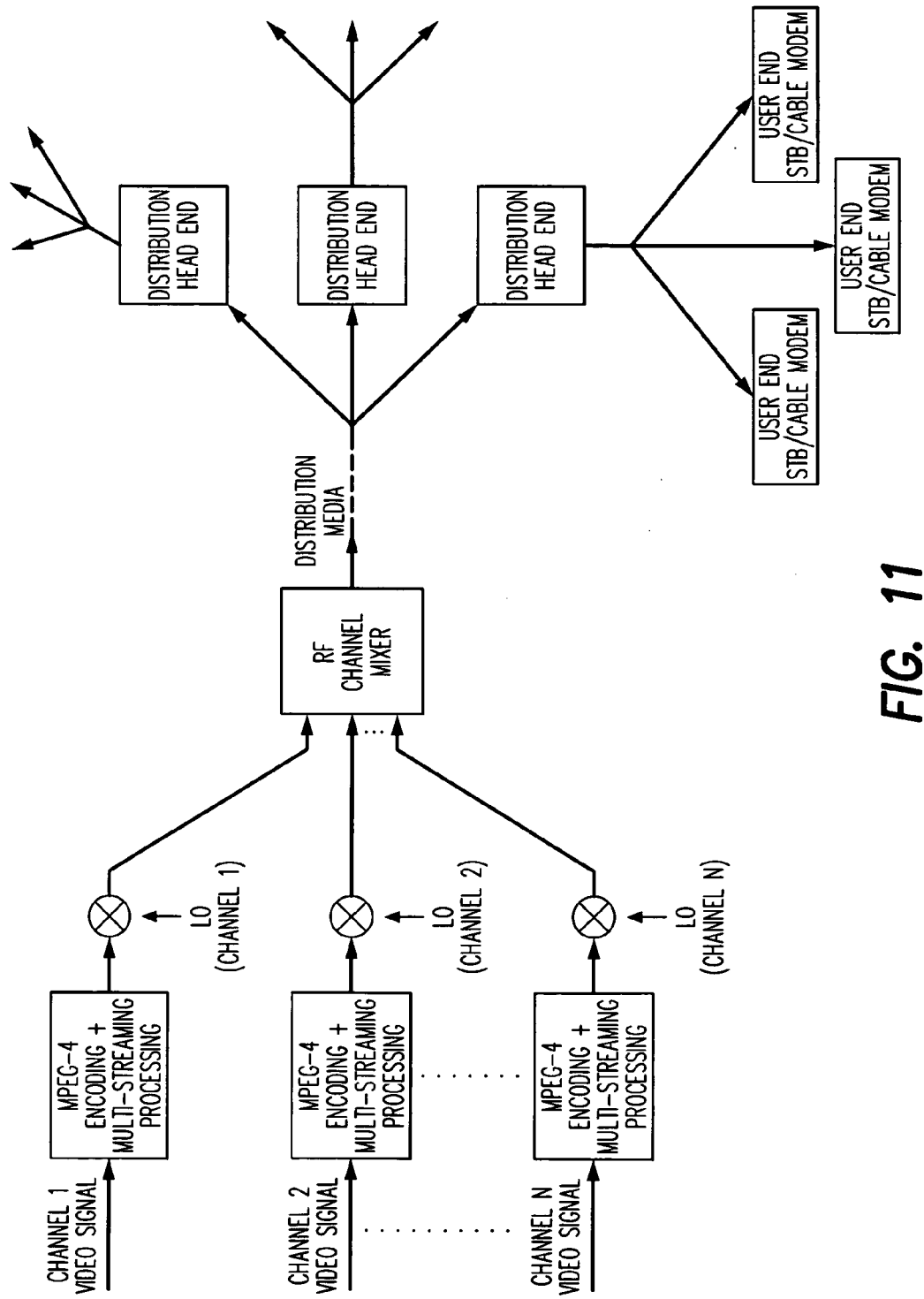
FIG. 11 shows the system configuration of a multicast data streams generator of the data transmission system of this invention.

In these digital broadcasting systems, the RF transmission bands are usually divided into 6 MHz (NTSC) or 8 MHz (PAL) channels. There can be over a hundred channels in cable TV, terrestrial or satellite broadcasting system. FIG. 11 shows a typical system configuration for this multi-streaming system. It is very similar to existing broadcasting system. Only the transmission unit at the head end, which may be called an anti-latency device, and reception unit at the user end, the client/receiver, may need to be modified. At the head end, instead of sending analog signals in each channel, digital signals such as QAM are transmitted. Typically, one can put in 30–40 Mb/s into an RF channel. Assuming a 2-hour content, one can first use MPEG-4 or other compression algorithms to convert the analog signal into a digital stream with a bit rate of roughly 1 Mb/s. Using the Fibonacci dual-streaming (Configuration 3) or the optimal harmonic multi-streaming IVOD concept (Configuration 4), one can place 30 to 40 streams of the IVOD streams into a single RF channel. The contents are put into different RF channels according to the PAL/NTSC/SECAM standard to maintain compatibility with the existing broadcasting system, and each RF channel can contain a few hours of contents.

Figure 12:
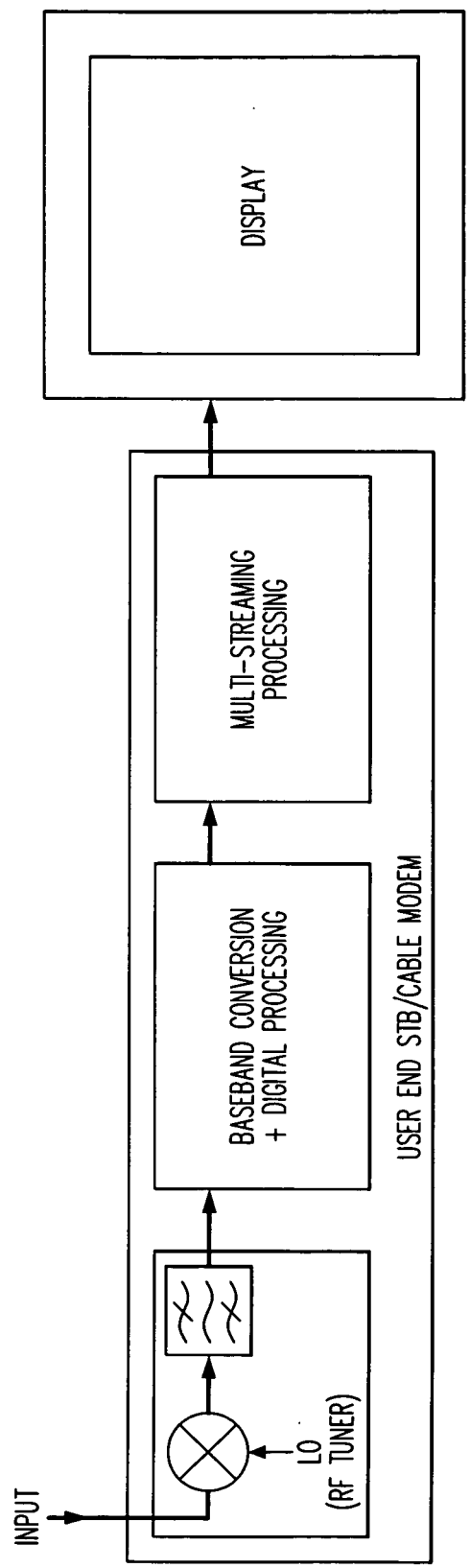
FIG. 12 shows the system configuration of receiver of the data transmission system of this invention.

At the user end, the set top box should be RF-tuned to the particular RE channel of interest. Then the cable modem would filter out the 30–40 Mb/s digital streams and decode two streams at a time (for Fibonacci dual-streaming systems) or decode all the harmonic multi-streams (for harmonic multi-streaming systems). FIG. 12 shows the block diagram of the STB/cable modem. The STB/cable modem is similar to other STB/cable modems except for its processing unit which can process at least 2 multi-streams simultaneously rather than a single stream. The decoded streams would be buffered in the STB and the content would be reconstructed according to the sequence number of the segments. With the hundreds of channels available in a typical broadcasting system, this translates to over 200 hours or more of fully interactive programs available to an infinite number of users.

While the preferred embodiment of the present invention has been described in detail by the examples, it is apparent that modifications and adaptations of the present invention will occur to those skilled in the art. It is to be expressly understood, however, that such modifications and adaptations are within the scope of the present invention, as set forth in the following claims. Furthermore, the embodiments of the present invention shall not be interpreted to be restricted by the examples or figures only.

The invention claimed is:

1. A method for transmitting data over a network to at least one client having a latency time to initiate transmission of said data to the client, including the steps of:

generating M anti-latency data streams containing at least a leading portion of data for receipt by the client, wherein said data is fragmented into K segments each requiring a time T to transmit over the network, and wherein each of the M anti-latency data streams contains substantially identical data having J segments that are repeated continuously within said anti-latency data stream, and each successive anti-latency data stream is staggered by an anti-latency time interval $\geq T$; and generating N interactive data streams containing at least a remaining portion of said data for the client to merge into after receiving at least a portion of an anti-latency data stream, wherein each of the N interactive data streams repeats continuously within said interactive data stream, and each successive interactive data stream is staggered by an interactive time interval;

wherein:

J, K, M and N are integers,

T is a length of time, and $M=N=J=\sqrt{R/T}$, where R is the length of time required to transmit said data over the network.

2. A method for transmitting data over a network to at least one client having a latency time to initiate transmission of said data to the client, including the steps of:

generating M anti-latency data streams containing at least a leading portion of data for receipt by the client, wherein said data is fragmented into K segments each requiring a time T to transmit over the network, wherein each anti-latency data stream includes:

a leading data stream containing at least one leading segment of the leading portion of said data being repeated continuously within the leading data stream; and a plurality of finishing data streams each having J segments, each of the finishing data streams containing the rest of said leading portion of said data; and
being repeated continuously within said finishing data stream, and wherein each successive finishing data stream is staggered by an anti-latency time interval $\geq T$; and generating N interactive data streams containing at least a remaining portion of said data for the client to merge into after receiving at least a portion of an anti-latency data stream, wherein each of the N interactive data streams is repeated continuously within said interactive data stream, and each successive interactive data stream is staggered by an interactive time interval;

wherein:
J, K, M and N are integers,
T is a length of time,
$M=(J/2)+1$, and
$J=\sqrt{2K}$.

3. A method for transmitting data over a network to at least one client having a latency time to initiate transmission of said data to the client, including the steps of:

generating M anti-latency data streams containing at least a leading portion of data for receipt by the client, wherein said data is fragmented into K segments each requiring a time T to transmit over the network, and wherein the anti-latency data streams are generated such that an $m^{th}$ anti-latency data stream has $F_m$ segments, wherein $F_m$ is an $m^{th}$ Fibonacci number; and the $F_m$ segments are repeated continuously within the $m^{th}$ anti-latency data stream; and generating N interactive data streams containing at least a remaining portion of said data for the client to merge into after receiving at least a portion of an anti-latency data stream, wherein each of the N interactive data streams repeats continuously within said interactive data stream, and each successive interactive data stream is staggered by an interactive time interval=KT/N;

wherein m starts from 4 and the repeating $1^{st}$, $2^{nd}$, and $3^{rd}$ anti-latency data streams have the following configuration:

segment is repeated by an anti-latency time interval $\leq jT$ within the anti-latency data streams; and generating N interactive data streams containing at least a remaining portion of said data for the client to merge into after receiving at least a portion of an anti-latency data stream, wherein each of the N interactive data streams repeats continuously within said interactive data stream, and each successive interactive data stream is staggered by an interactive time interval=KT/N;

wherein:
J, K, M and N are integers,
T is a length of time,
$J=K/N$, and

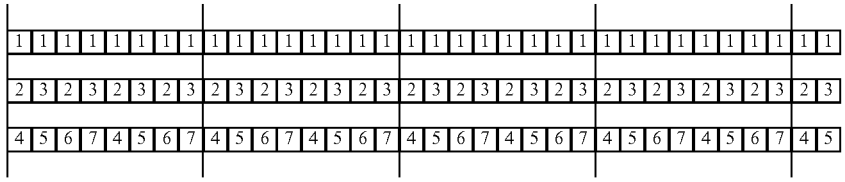

5. A method for transmitting data over a network to at least one client having a latency time to initiate transmission of said data to the client, including the steps of:

generating M anti-latency data streams containing at least a leading portion of data for receipt by the client, wherein said data is fragmented into K segments each requiring a time T to transmit over the network, and wherein in the M anti-latency data streams the leading portion of said data contains 1 to J leading labeled data segments, and the leading data segments are distributed in the M anti-latency data streams such that a $j^{th}$ leading segment is repeated by an anti-latency time interval $\leq JT$ within the anti-latency data streams; and generating N interactive data streams containing at least a remaining portion of said data for the client to merge

| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|---|---|---|---|---|---|---|---|---|---|---|
| 2 | 3 | 2 | 3 | 2 | 3 | 2 | 3 | 2 | 3 | 2 | 3 | 2 | 3 | 2 | 3 | 2 | 3 | 2 | 3 | 2 | 3 | 2 | 3 | 2 | 3 | 2 | 3 | 2 | 3 | 2 | 3 |
| 4 | 5 | 6 | 7 | 4 | 5 | 6 | 7 | 4 | 5 | 6 | 7 | 4 | 5 | 6 | 7 | 4 | 5 | 6 | 7 | 4 | 5 | 6 | 7 | 4 | 5 | 6 | 7 | 4 | 5 | | | and wherein:
K, M and N are integers, and
T is a length of time.

4. A method for transmitting data over a network to at least one client having a latency time to initiate transmission of said data to the client, including the steps of:

generating M anti-latency data streams containing at least a leading portion of data for receipt by the client, wherein said data is fragmented into K segments each requiring a time T to transmit over the network, and wherein in the M anti-latency data streams the leading portion of said data contains 1 to J leading labeled data segments, and the leading data segments are distributed in the M anti-latency data streams such that a $j^{th}$ leading into after receiving at least a portion of an anti-latency data stream, wherein each of the N interactive data streams repeats continuously within said interactive data stream, and each successive interactive data stream is staggered by an interactive time interval=KT/N;

wherein:
J, K, M and N are integers,
T is a length of time,
$J=K/N$, and wherein six of the M anti-latency data streams containing the leading data segments are arranged as follows:

|1|1|1|1|1|1|1|1|1|1|1|1|1|1|1|1|1|1|1|1|1|1|1|1|1|1|1|1|1|1|1|1|
|---|---|---|---|---|---|---|---|---|---|---|---|---|---|---|---|---|---|---|---|---|---|---|---|---|---|---|---|---|---|---|---|
|2|4|2|8|2|4|2|16|2|4|2|8|2|4|2|32|2|4|2|8|2|4|2|16|2|4|2|8|2|4|2|64|2|4|
|3|6|9|3|12|42|3|6|18|3|24|9|6|6| |3|12|48|3|6|9|3|36|39|3|6|18|3|12|9|3|6| |3|
|5|10|15|25| |5|20| | | |5|10|30| |35|5|40|15| | |5|10|45|50| |5|20|55|25|60|5|10|15| |
|7|14|21|11|13|17|19|7|28|22|23|26|27|11|7|14|29|13|31|33|34|7|17|21|11|19|37|31|7|14|13|22|33|23|
|38|41| |43|44| |46|47|49| | | |51|52| | | |53| |54| |56|57| |58| |59| |61| |62|63| | wherein blank segments contain any data.

6. A method for transmitting data over a network to at least one client having a latency time to initiate transmission of said data to the client, including the steps of:

generating M anti-latency data streams containing at least a leading portion of data for receipt by the client, wherein said data is fragmented into K segments each requiring a time T to transmit over the network, and wherein the M anti-latency data streams contain the leading portion of said data, and further include two batches of data streams comprising a first set of anti-latency data streams and a second set of anti-latency data streams, such that the first anti-latency data streams have A first anti-latency data streams from 1 to A, wherein an $a^{th}$ anti-latency data stream has $F_a$ segments, where $F_a$ is an $a^{th}$ Fibonacci number, and the $F_a$ segments are repeated continuously within the $a^{th}$ first anti-latency data stream the second anti-latency data streams have B second anti-latency data streams wherein each of the B second anti-latency data streams contains substantially identical data repeated continuously within said second anti-latency data stream, and wherein each successive second anti-latency data stream is staggered by a coarse-jump frame period, such that the client can perform a coarse-jump function when the client is connected to a second anti-latency data steam; and generating N interactive data streams containing at least a remaining portion of said data for the client to merge into after receiving at least a portion of an anti-latency data stream;

wherein:

A, B, K, M and N are integers, and

T is a length of time.

7. The method of claim 6, further including the steps of:

connecting the client to at least the $a^{th}$ and $(a+1)^{th}$ first anti-latency data streams when the client raises a request for said data;

buffering the data in at least the $a^{th}$ and $(a+1)^{th}$ first anti-latency data streams in the client;

subsequently connecting the client to successive first anti-latency data streams; and repeating the previous steps until all data in the A first anti-latency data streams is received by the client.

8. The method of claim 7, further including the steps of:

connecting the client to any one of the B second anti-latency data streams after all data in the first anti-latency data streams is received by the client; and connecting the client to anyone of the N interactive data streams after all data in the connected B second anti-latency data stream is received by the client.

9. The method of claim 6, wherein each of the N interactive data streams contains the whole set of said data having K segments.

10. The method of claim 6, wherein each of the N interactive data streams contains the remaining portion of said data only.

11. The method of claim 6, wherein said coarse-jump frame period includes E data segments, and $F_a \geq 2E$.

12. The method of claim 6, wherein a starts from 1.

13. The method of claim 6, wherein a starts from 4 and the repeating first, second, and third anti-latency data streams have the following configuration:

|1|1|1|1|1|1|1|1|1|1|1|1|1|1|1|1|1|1|1|1|1|1|1|1|1|1|1|1|1|1|1|1|
|---|---|---|---|---|---|---|---|---|---|---|---|---|---|---|---|---|---|---|---|---|---|---|---|---|---|---|---|---|---|---|---|
|2|3|2|3|2|3|2|3|2|3|2|3|2|3|2|3|2|3|2|3|2|3|2|3|2|3|2|3|2|3|2|3|
|4|5|6|7|4|5|6|7|4|5|6|7|4|5|6|7|4|5|6|7|4|5|6|7|4|5|6|7|4|5|4|5|

14. A method for transmitting data over a network to at least one client having a latency time to initiate transmission of said data to the client, including the steps of:

generating M anti-latency data streams containing at least a leading portion of data for receipt by the client, wherein said data is fragmented into K segments each requiring a time T to transmit over the network, and wherein the M anti-latency data streams contain the leading portion of said data, and further include two batches of data streams comprising a first set of anti-latency data streams and a second set of anti-latency data streams, such that the first anti-latency data streams have A first anti-latency data streams from 1 to A, wherein an $a^{th}$ anti-latency data stream has $F_a$ segments, and $F_a$ is an $a^{th}$ Fibonacci number; and the $F_a$ segments are repeated continuously within the $a^{th}$ first anti-latency data stream, and the second anti-latency data streams have B second anti-latency data streams including a leading data stream containing at least one leading segment of the leading portion of said data being repeated continuously within the leading data stream; and a plurality of finishing data streams, each of the finishing data streams containing the rest of the leading portion of said data; and being repeated continuously within said finishing data stream, wherein each successive finishing data steam is staggered by a coarse-jump frame period such that the client can perform a coarse-jump interactive function when the client is connected to a second anti-latency data stream; and generating N interactive data streams containing at least a remaining portion of said data for the client to merge into after receiving at least a portion of an anti-latency data stream;

wherein:
A, B, K, M and N are integers, and
T is a length of time.

15. The method of claim 14, further including the steps of:
connecting the client to at least the $a^{th}$ and $(a+1)^{th}$ first anti-latency data streams when the client raises a request for said data;
buffering the data in at least the $a^{th}$ and $(a+1)^{th}$ first anti-latency data streams in the client;
subsequently connecting the client to successive first anti-latency data streams; and
repeating the previous steps until all data in the A first anti-latency data streams is received by the client.

16. The method of claim 15, further including the steps of:
connecting the client to the leading data stream after all data in the first anti-latency data streams is received by the client;
subsequently connecting the client to any one of the finishing data streams; and connecting the client to any one of the N interactive data streams after all data in the B second anti-latency data streams is received by the client.

17. The method of claim 14, wherein each of the N interactive data steams contains the whole set of said data having K segments.

18. The method of claim 14, wherein each of the N interactive data streams contains the remaining portion of said data only.

19. The method of claim 14, wherein said coarse-jump frame period includes E data segments, and $F_a \geq 2E$.

20. The method of claim 14, wherein a starts from 1.

21. The method of claim 14, wherein a starts from 4 and the repeating first, second, and third data streams of the A first anti-latency data streams have the following configuration:

| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|---|---|---|---|---|---|---|---|---|---|---|
| 2 | 3 | 2 | 3 | 2 | 3 | 2 | 3 | 2 | 3 | 2 | 3 | 2 | 3 | 2 | 3 | 2 | 3 | 2 | 3 | 2 | 3 | 2 | 3 | 2 | 3 | 2 | 3 | 2 | 3 | 2 | 3 |
| 4 | 5 | 6 | 7 | 4 | 5 | 6 | 7 | 4 | 5 | 6 | 7 | 4 | 5 | 6 | 7 | 4 | 5 | 6 | 7 | 4 | 5 | 6 | 7 | 4 | 5 | 6 | 7 | 4 | 5 | | |

22. A method for transmitting data over a network to at least one client having a latency time to initiate transmission of said data to the client, including the steps of:

generating M anti-latency data streams containing at least a leading portion of data for receipt by the client, wherein said data is fragmented into K segments each requiring a time T to transmit over the network, and wherein the M anti-latency data streams contain the leading portion of said data, and further include two batches of data streams comprising a first set of anti-latency data streams and a second set of anti-latency data streams, such that the first anti-latency data streams have A first anti-latency data streams, wherein, I. the A first anti-latency data streams contains 1 to C first data segments; and II. the first data segments are distributed in the A first anti-latency data streams such that an $c^{th}$ leading segment is repeated by an anti-latency time interval $\leq cT$ within the A first anti-latency data streams, and the second anti-latency data streams have B second anti-latency data streams, wherein each of the B second anti-latency data streams contains substantially identical data repeated continuously within said second anti-latency data stream, and wherein each successive second anti-latency data stream is staggered by a coarse-jump frame period; such that the client can perform a coarse-jump interactive function when the client is connected to a second anti-latency data stream; and generating N interactive data streams containing at least a remaining portion of said data for the client to merge into after receiving at least a portion of an anti-latency data stream;

wherein:
A, B, C, K, M and N are integers, and
T is a length of time.

23. The method of claim 22, further including the steps of:
connecting the client to all of the A first anti-latency data streams when the client raises a request for said data; and
buffering data in the A first anti-latency data streams in the client until all data in the A first anti-latency data streams is received by the client.

24. The method of claim 23, further including the steps of:
connecting the client to any one of the B second anti-latency data streams after all data in the first anti-latency data streams is received by the client; and
connecting the client to anyone of the N interactive data streams after all data in the connected B second anti-latency data stream is received by the client.

25. The method of claim 22, wherein each of the N interactive data streams contains the whole set of said data having K segments.

26. The method of claim 22, wherein each of the N interactive data streams contains the remaining portion of said data only.

27. The method of claim 22, wherein said coarse-jump frame period includes E data segments, and $$A \geq \sum_{c=1}^{c=E} \left(\frac{1}{c}\right).$$

28. The method of claim 22, wherein six of the A first anti-latency data streams are arranged as follows:

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | 4 | 2 | 8 | 2 | 4 | 2 | 16 | 2 | 4 | 2 | 8 | 2 | 4 | 2 | 32 | 2 | 4 | 2 | 8 | 2 | 4 | 2 | 16 | 2 | 4 | 2 | 8 | 2 | 4 | 2 | 64 | 2 | 4 |
| 3 | 6 | 9 | 3 | 12 | 42 | 3 | 6 | 18 | 3 | 24 | 9 | 6 | 6 | | 3 | 12 | 48 | 3 | 6 | 9 | 3 | 36 | 39 | 3 | 6 | 18 | 3 | 12 | 9 | 3 | 6 | | 3 |
| 5 | 10 | 15 | 25 | | 5 | 20 | | | | | 5 | 10 | 30 | | 35 | 5 | 40 | 15 | | | 5 | 10 | 45 | 50 | | 5 | 20 | 55 | 25 | 60 | 5 | 10 | 15 | |
| 7 | 14 | 21 | 11 | 13 | 17 | 19 | 7 | 28 | 22 | 23 | 26 | 27 | 11 | 7 | 14 | 29 | 13 | 31 | 33 | 34 | 7 | 17 | 21 | 11 | 19 | 37 | 31 | 7 | 14 | 13 | 22 | 33 | 23 |
| 38 | 41 | | 43 | 44 | | 46 | 47 | 49 | | | | 51 | 52 | | | | 53 | | 54 | | | 56 | 57 | | 58 | | 59 | | 61 | | 62 | 63 | | wherein blank segments contain any data.

29. A method for transmitting data over a network to at least one client having a latency time to initiate transmission of said data to the client, including the steps of:
generating M anti-latency data streams containing at least a leading portion of data for receipt by the client, wherein said data is fragmented into K segments each requiring a time T to transmit over the network, and wherein the M anti-latency data streams contain the leading portion of said data, and further include two batches of data streams comprising a first set of anti-latency data streams and a second set of anti-latency data streams, such that
the first anti-latency data streams have A first anti-latency data steams, wherein the A first anti-latency data streams contain 1 to C first data segments, and the first data segments are distributed in the A first anti-latency data streams such that an $c^{th}$ leading segment is repeated by an anti-latency time interval $\leq cT$ within the A first anti-latency data streams, and
the second anti-latency data streams have B second anti-latency data stream including a leading data stream containing at least one leading segment of the leading portion of said data being repeated continuously within the leading data stream, and a plurality of finishing data streams, each of the finishing data streams connecting the rest of the leading portion of said data, and being repeated continuously with said finishing data stream, and wherein each successive finishing data stream is staggered by a coarse-jump frame period such that the client can perform a coarse-jump interactive function when the client is connected to a second anti-latency data stream; and
generating N interactive data streams containing at least a remaining portion of said data for the client to merge into after receiving at least a portion of an anti-latency data stream;
wherein:
A, B, C, K, M and N are integers, and
T is a length of time.

30. The method of claim 29, further including the steps of:
connecting the client to all of the A first anti-latency data streams when the client raises a request for said data; and
buffering data in the A first is anti-latency data streams in the client until all data in the A first anti-latency data streams is received by the client.

31. The method of claim 30, further including the steps of:
connecting the client to the leading data stream of the B second anti-latency data streams after all data in the first anti-latency data streams is received by the client;
subsequently connecting the client to any one of the finishing data streams; and
connecting the client to any one of the N interactive data streams after all data in the second anti-latency data stream is received by the client.

32. The method of claim 31, wherein six of the A first anti-latency data steams are arranged as follows:

```
|1|1|1|1|1|1|1|1|1|1|1|1|1|1|1|1|1|1|1|1|1|1|1|1|1|1|1|1|1|1|1|1|
|2|4|2|8|2|4|2|16|2|4|2|8|2|4|2|32|2|4|2|8|2|4|2|16|2|4|2|8|2|4|2|64|2|4|
|3|6|9|3|12|42|3|6|18|3|24|9|6|6| |3|12|48|3|6|9|3|36|39|3|6|18|3|12|9|3|6| |3|
|5|10|15|25| |5|20| | | |5|10|30| |35|5|40|15| | |5|10|45|50| |5|20|55|25|60|5|10|15| |
|7|14|21|11|13|17|19|7|28|22|23|26|27|11|7|14|29|13|31|33|34|7|17|21|11|19|37|31|7|14|13|22|33|23|
|38|41| |43|44| |46|47|49| | | |51|52| | |53|54| |56|57| |58| |59| |61| |62|63| |
``` wherein blank segments contain any data.

33. The method of claim 29, wherein each of the N interactive data streams contains the whole set of said data having K segments.

34. The method of claim 29, wherein each of the N interactive data streams contains the remaining portion of said data only.

35. The method of claim 29, wherein said coarse-jump frame period includes E data segments, and $$A \geq \sum_{c=1}^{c=E}\left(\frac{1}{c}\right).$$

36. A method for transmitting data over a network to at least one client including the step of generating M anti-latency data streams from 1 to M, wherein an $m^{th}$ anti-latency data stream has $F_m$ segments, and $F_m$ is an $m^{th}$ Fibonacci number; and said $F_m$ segments are repeated continuously within the $m^{th}$ anti-latency data stream, and wherein m starts from 4 and the repeating first, second, and third anti-latency data streams have the following configuration:

```
|1|1|1|1|1|1|1|1|1|1|1|1|1|1|1|1|1|1|1|1|1|1|1|1|1|1|1|1|1|1|1|1|
|2|3|2|3|2|3|2|3|2|3|2|3|2|3|2|3|2|3|2|3|2|3|2|3|2|3|2|3|2|3|2|3|
|4|5|6|7|4|5|6|7|4|5|6|7|4|5|6|7|4|5|6|7|4|5|6|7|4|5|6|7|4|5|6|7|4|5|
```
.

37. A method for transmitting data over a network to at least one client, said data being fragmented into K segments each requiring a time T to transmit over the network, including the steps of: generating M anti-latency data streams containing 1 to K anti-latency data segments, wherein the anti-latency data segments are distributed in the M anti-latency data streams such that an $k^{th}$ leading segment is repeated by an anti-latency time interval $\leq kT$ within the anti-latency data streams, and wherein six of the M anti-latency data streams containing the leading data segments are arranged as follows:

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | 4 | 2 | 8 | 2 | 4 | 2 | 16 | 2 | 4 | 2 | 8 | 2 | 4 | 2 | 32 | 2 | 4 | 2 | 8 | 2 | 4 | 2 | 16 | 2 | 4 | 2 | 8 | 2 | 4 | 2 | 64 | 2 | 4 |
| 3 | 6 | 9 | 3 | 12 | 42 | 3 | 6 | 18 | 3 | 24 | 9 | 6 | 6 | | 3 | 12 | 48 | 3 | 6 | 9 | 3 | 36 | 39 | 3 | 6 | 18 | 3 | 12 | 9 | 3 | 6 | | 3 |
| 5 | 10 | 15 | 25 | | 5 | 20 | | | | 5 | 10 | 30 | | 35 | 5 | 40 | 15 | | | 5 | 10 | 45 | 50 | | 5 | 20 | 55 | 25 | 60 | 5 | 10 | 15 | |
| 7 | 14 | 21 | 11 | 13 | 17 | 19 | 7 | 28 | 22 | 23 | 26 | 27 | 11 | 7 | 14 | 29 | 13 | 31 | 33 | 34 | 7 | 17 | 21 | 11 | 19 | 37 | 31 | 7 | 14 | 13 | 22 | 33 | 23 |
| 38 | 41 | | 43 | 44 | | 46 | 47 | 49 | | | | 51 | 52 | | | 53 | | 54 | | | 56 | 57 | | 58 | | 59 | | 61 | | 62 | 63 | | wherein blank segments contain any data.

38. A method for transmitting data over a network to at least one client having a latency time to initiate transmission of said data to the client, including the steps of:
  generating M anti-latency data streams containing at least a leading portion of data for receipt by the client, wherein said data is fragmented into K segments each requiring a time T to transmit over the network;
  generating N interactive data streams containing at least a remaining portion of said data for the client to merge into after receiving at least a portion of an anti-latency data stream;
  raising a request for said data;
  connecting the client to the M anti-latency data streams and receiving data in the M anti-latency data streams;
  pre-fetching at least a portion of data in the M anti-latency data streams in the client as pre-fetched data; and
  refreshing the pre-fetched data during a refresh time period, wherein the refresh time period is 01:00–06:00, and wherein:
    K, M and N are integers, and
    T is a length of time.

39. A method for transmitting data over a network to at least one client having a latency time to initiate transmission of said data to the client, including the steps of:
  generating M anti-latency data streams containing at least a leading portion of data for receipt by the client, wherein said data is fragmented into K segments each requiring a time T to transmit over the network;
  generating N interactive data streams containing at least a remaining portion of said data for the client to merge into after receiving at least a portion of an anti-latency data stream;
  raising a request for said data;
  connecting the client to the M anti-latency data streams and receiving data in the M anti-latency data streams;
  pre-fetching at least a portion of data in the M anti-latency data streams in the client as pre-fetched data; and
  refreshing the pre-fetched data during a refresh time period, wherein the refresh time period is 10:00–15:00, and wherein:
    K, M and N are integers, and
    T is a length of time.

\* \* \* \* \*